United States Patent [19]

Hashimoto et al.

[11] 4,426,327
[45] Jan. 17, 1984

[54] 3,6-DISAZO-9-ETHYL CARBAZOLE COMPOUNDS

[75] Inventors: Mitsuru Hashimoto, Hino; Ohta Masafumi Ohta; Akio Kozima, both of Yokohama; Kiyoshi Sakai, Tokyo; Masaomi Sasaki, Kawasaki, all of Japan

[73] Assignee: Ricoh Co., Ltd., Tokyo, Japan

[21] Appl. No.: 204,150

[22] Filed: Nov. 5, 1980

Related U.S. Application Data

[62] Division of Ser. No. 872,679, Jan. 26, 1978, Pat. No. 4,293,628.

[30] Foreign Application Priority Data

Jan. 31, 1977 [JP] Japan .................. 52-8740
Jan. 31, 1977 [JP] Japan .................. 52-8741

[51] Int. Cl.³ .................. C09B 35/24; C09B 35/34; C07D 209/88; G03G 5/06
[52] U.S. Cl. .................. 260/160; 260/164; 430/79; 430/82; 430/519; 430/58
[58] Field of Search .................. 260/160, 161, 164

[56] References Cited

U.S. PATENT DOCUMENTS

| | | | |
|---|---|---|---|
| 1,697,107 | 1/1929 | Clingstein et al. | 260/164 |
| 1,751,683 | 3/1930 | Clingstein et al. | 260/164 |
| 1,967,373 | 7/1934 | Schrader et al. | 260/164 |
| 4,293,492 | 10/1981 | Sasaki et al. | 260/160 |

FOREIGN PATENT DOCUMENTS 53-95966  8/1978  Japan .................. 260/164

Primary Examiner—Floyd D. Higel
Attorney, Agent, or Firm—Flynn, Thiel, Boutell & Tanis

[57] ABSTRACT

The present invention provides disazo compounds expressed by the general formula

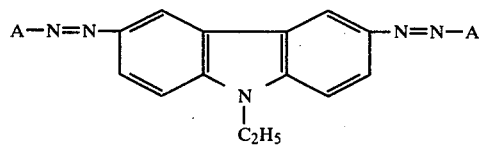

[wherein A represents

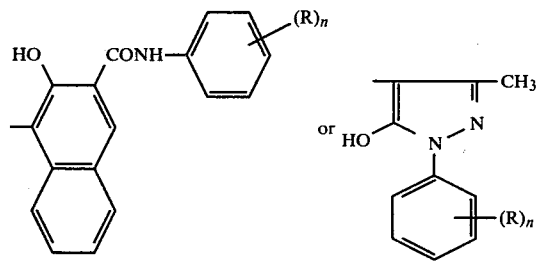

(wherein R represents alkyl radical, alkoxy radical, nitro radical, dialkylamino radical or halogen, n is 0 or an integer ranging from 1 to 3, and R may be identical or different when n is an integer of 2 or 3)]; a process for the preparation of said compounds; and photosensitive materials having a high sensitivity as well as a high flexibility which comprises a conductive support and a photosensitive layer formed thereon, said photosensitive layer containing a disazo pigment, as an effective ingredient, which is expressed by the general formula

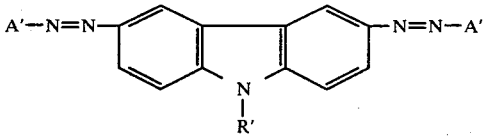

[wherein R' represents a member selected from the group consisting of hydrogen, ethyl radical, chloroethyl radical and hydroxyethyl radical, A' represents a member selected from the group consisting of 4,426,327
Page 2

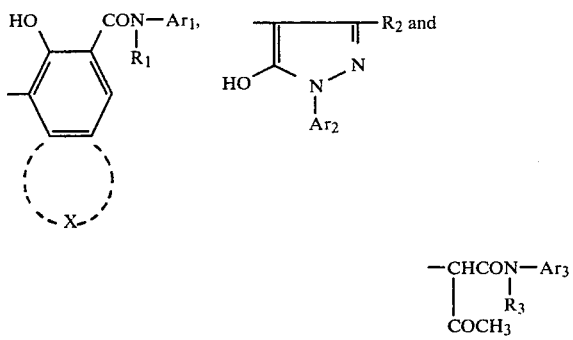

—CHCON—Ar₃
|   |
|   R₃
COCH₃

(wherein X represents a member selected from the group consisting of aromatic rings such as benzene ring, naphthalene ring, etc., heterocyclic rings such as indole ring, carbazole ring, benzofuran ring, etc. and their substituents, $Ar_1$ represents a member selected from the group consisting of aromatic rings such as benzene ring, naphthalene ring, etc., heterocyclic rings such as dibenzofuran ring, etc. and their substituents, $Ar_2$ and $Ar_3$ represent respectively a member selected from the group consisting of aromatic rings such as benzene ring, naphthalene ring, etc. and their substituents, $R_1$ and $R_3$ represent respectively a member selected from the group consisting of hydrogen, lower alkyl radical or phenyl radical and their substituents, and $R_2$ represents a member selected from the group consisting of lower alkyl radical, carboxyl radical and their esters)].

3 Claims, 9 Drawing Figures

3,6-DISAZO-9-ETHYL CARBAZOLE COMPOUNDS

This is a division of application Ser. No. 872,679, filed Jan. 26, 1978, now U.S. Pat. No. 4,293,628.

BACKGROUND OF THE INVENTION (a) Field of the Invention

The present invention relates to novel disazo compounds, a process for the preparation of same, and an application of said disazo compounds and analogues thereof to electrophographic sensitive materials.

(b) Description of the Prior Art

It is known that some organic compounds are useful as a photoconductive material for preparing photosensitive materials for use in the electrophotographic process. The "electrophotographic process" herein is one of the image-forming processes which generally comprises first charging a photoconductive sensitive material with electricity by corona discharge or the like in the dark, subsequently subjecting it to image-wise exposure so as to discharge the electric charge of the exposed area selectively, thereby obtaining an electrostatic latent image, and then rendering visible this latent image by a developing means employing a developer, thereby forming an intended image. As the fundamental characteristics required for the photosensitive materials for use in the electrophotographic process, there are enumerated (1) an appropriate chargeability in the dark, (2) a low dischargeability in the dark, and (3) a rapid dischargeability with exposure to light.

As a matter of fact, however, the known organic photoconductive compounds have not always sufficiently satisfied these requirements. As applicable photoconductive materials, there are known, inorganic materials such as selenium, zinc oxide, etc., organic materials such as indigo-type compounds, phthalocyanine-type compounds, etc., of which selenium has admittedly been widely put to practical use. However, with adoption of various electrophotographic processes, there is an increasing demand for a photosensitive material suitable to any of these processes, that is, a demand for, for instance, a belt-shaped photosensitive material or the like having the aforementioned fundamental characteristics as well as a satisfactory flexibility with respect to the shape thereof. In this regard, selenium is generally difficult to form into a photosensitive material having such a shape as above.

Meanwhile, as electrophotographic sensitive materials prepared by forming a photosensitive layer containing some azo pigment, as an effective ingredient, on a conductive support, one prepared by employing monoazo pigment (cf. Japanese Patent Publication No. 16474/1969) and one prepared by employing benzidine type disazo pigment (cf. Japanese Patent Open No. 37543/1972) are well known. These azo pigments are admittedly useful materials as an effective ingredient the photosensitive layer as stated above, but when various requirements for photosensitive materials are taken into account from the viewpoint of the electrophotographic process, there has in fact not yet been obtained such a material as will sufficiently meet these requirements. Therefore, it is a matter of more importance to provide a wide variety of pigments, not limited to azo pigments, so as to afford a wide range of selection of pigments acting as an effective ingredient, thereby rendering it possible to provide a photosensitive material apposite to any specific process. In other words, it is desirable for the electrophotographic process that the variety of the pigments workable as an effective ingredient of photosensitive materials is as wide as possible.

A primary object of the present invention is to provide novel disazo compounds which are free from the drawbacks possessed by the photoconductive substances employed for the above described photosensitive materials and are especially useful as a photoconductive material, as well as a process for the preparation of said compounds.

A secondary object of the present invention is to provide electrophotographic sensitive materials having a high sensitivity as well as a high flexibility which materials contain a disazo pigment, said disazo pigment being selectable from a great variety and being useful as an effective ingredient in various electrophotographic processes.

BRIEF DESCRIPTION OF THE DRAWINGS

In FIGS. 7 to 9, the reference numeral 1 denotes a conductive support, 2,2' and 2" denote respectively a photosensitive layer, 3 denotes a binder, 4 denotes a disazo pigment, 5 denotes a charge-transfer medium, 6 denotes a charge-carrier-generating layer, and 7 denotes a charge-transfer medium layer.

Figure 1:
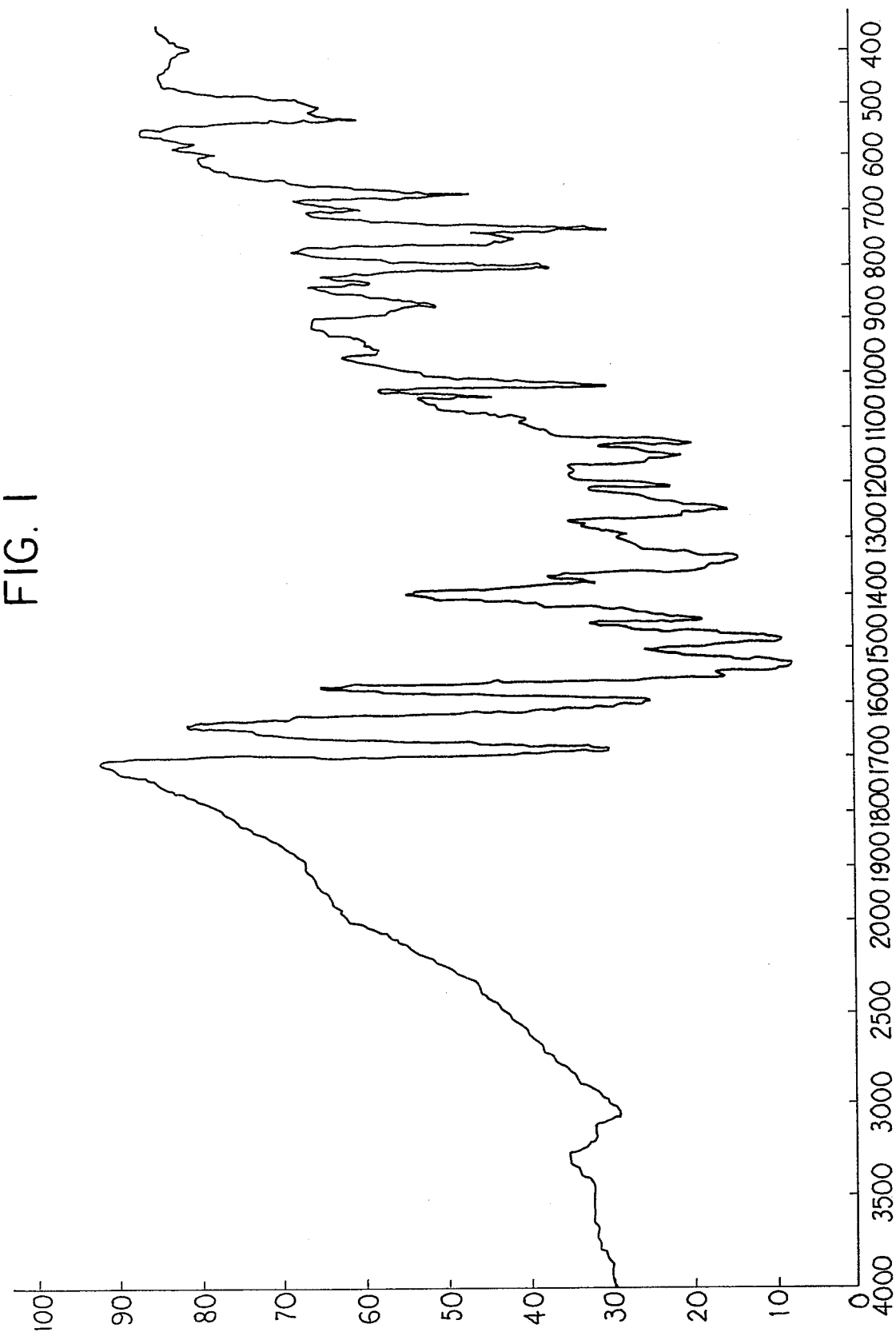
FIGS. 1 through 6 are the infrared absorption spectra of six examples of disazo compounds according to the present invention.
Figure 2:
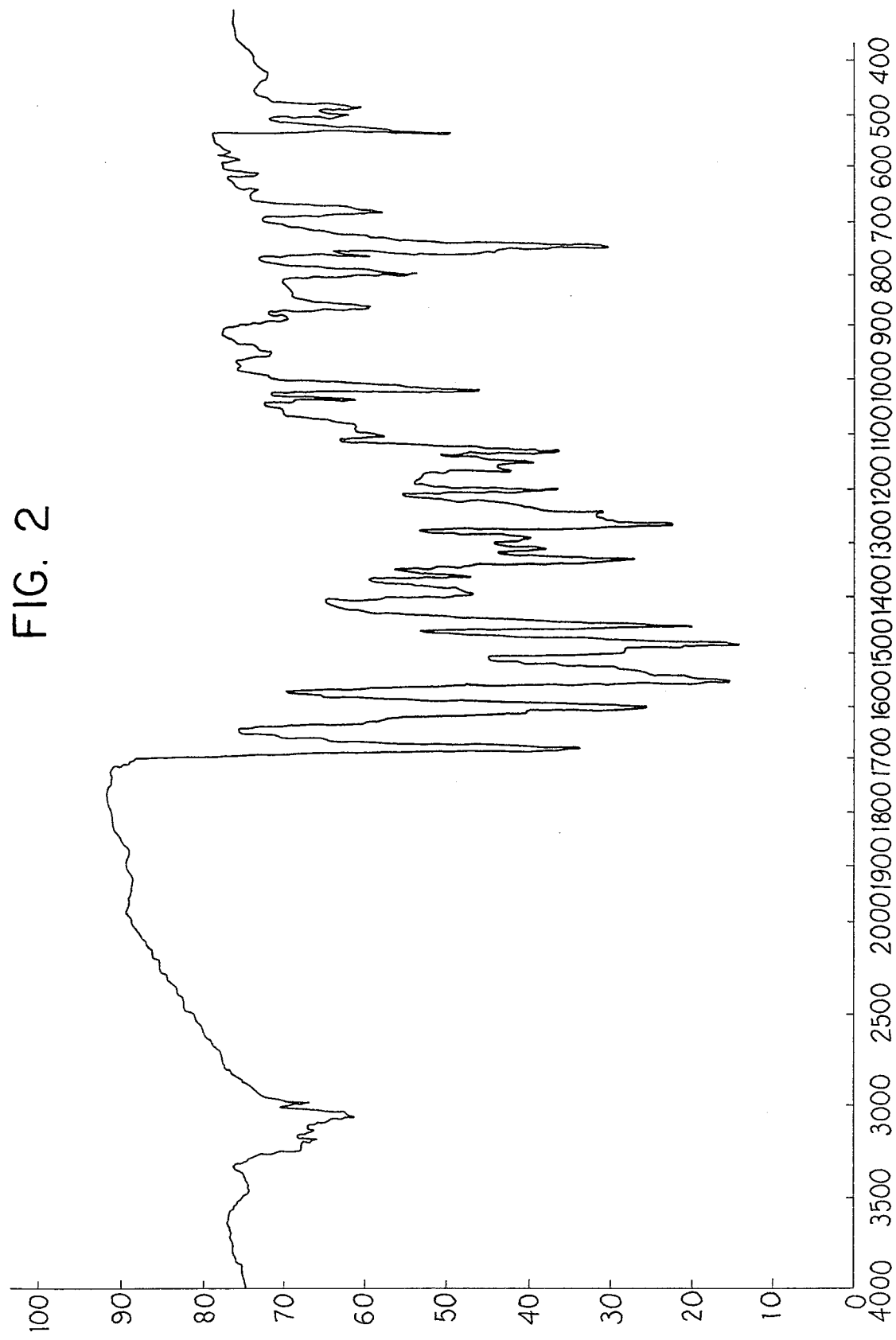
Figure 3:
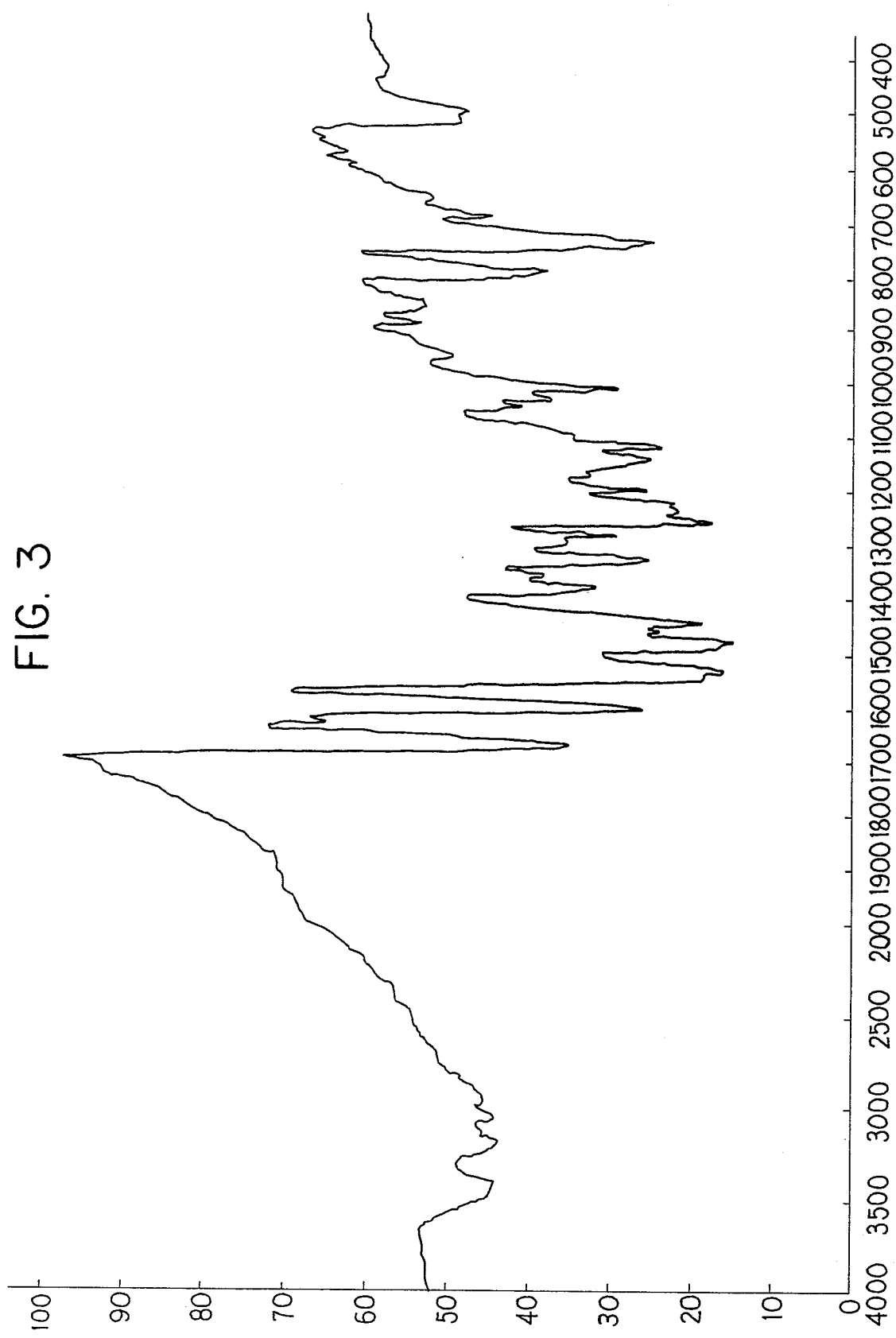
Figure 4:
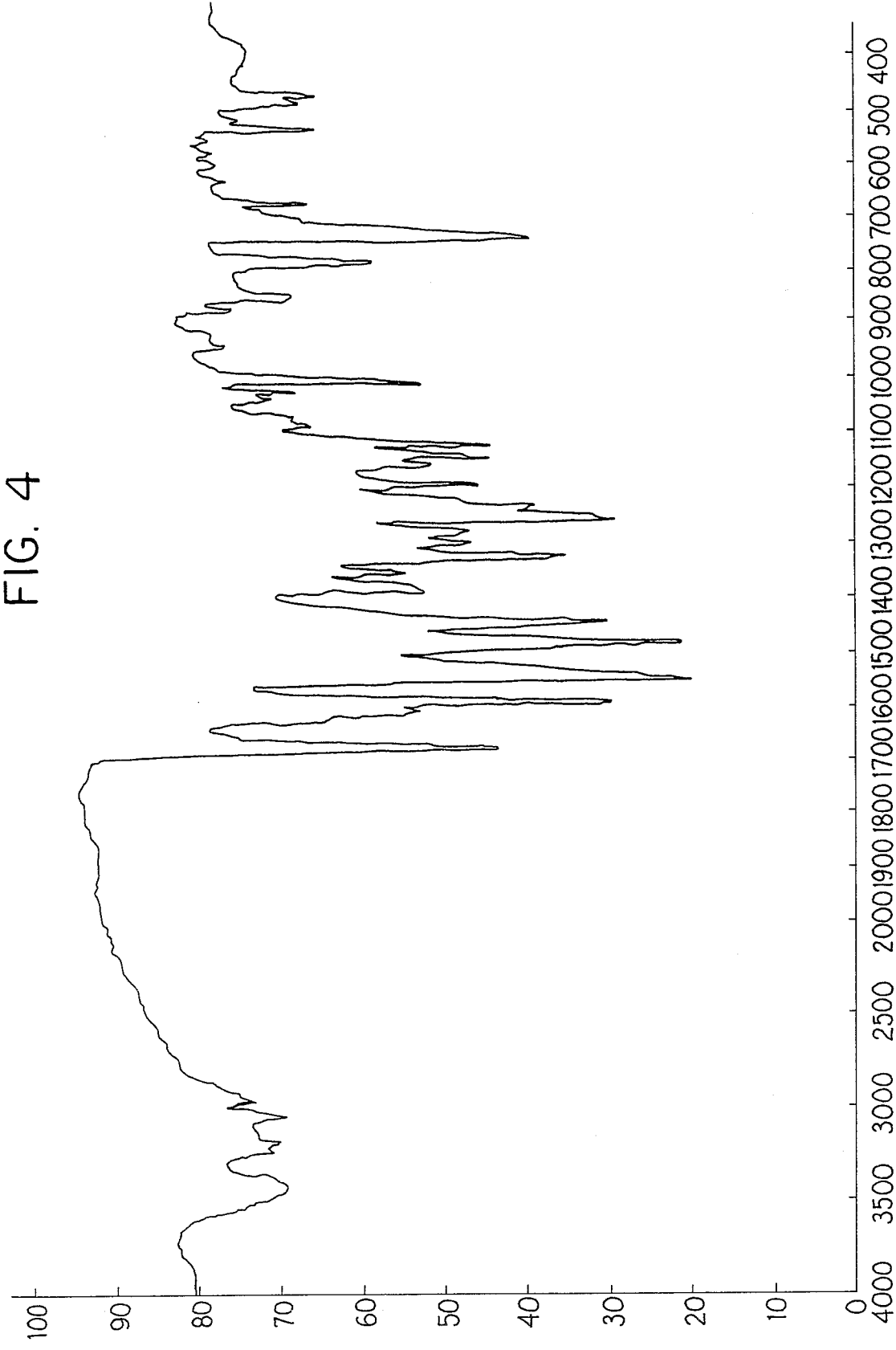
Figure 5:
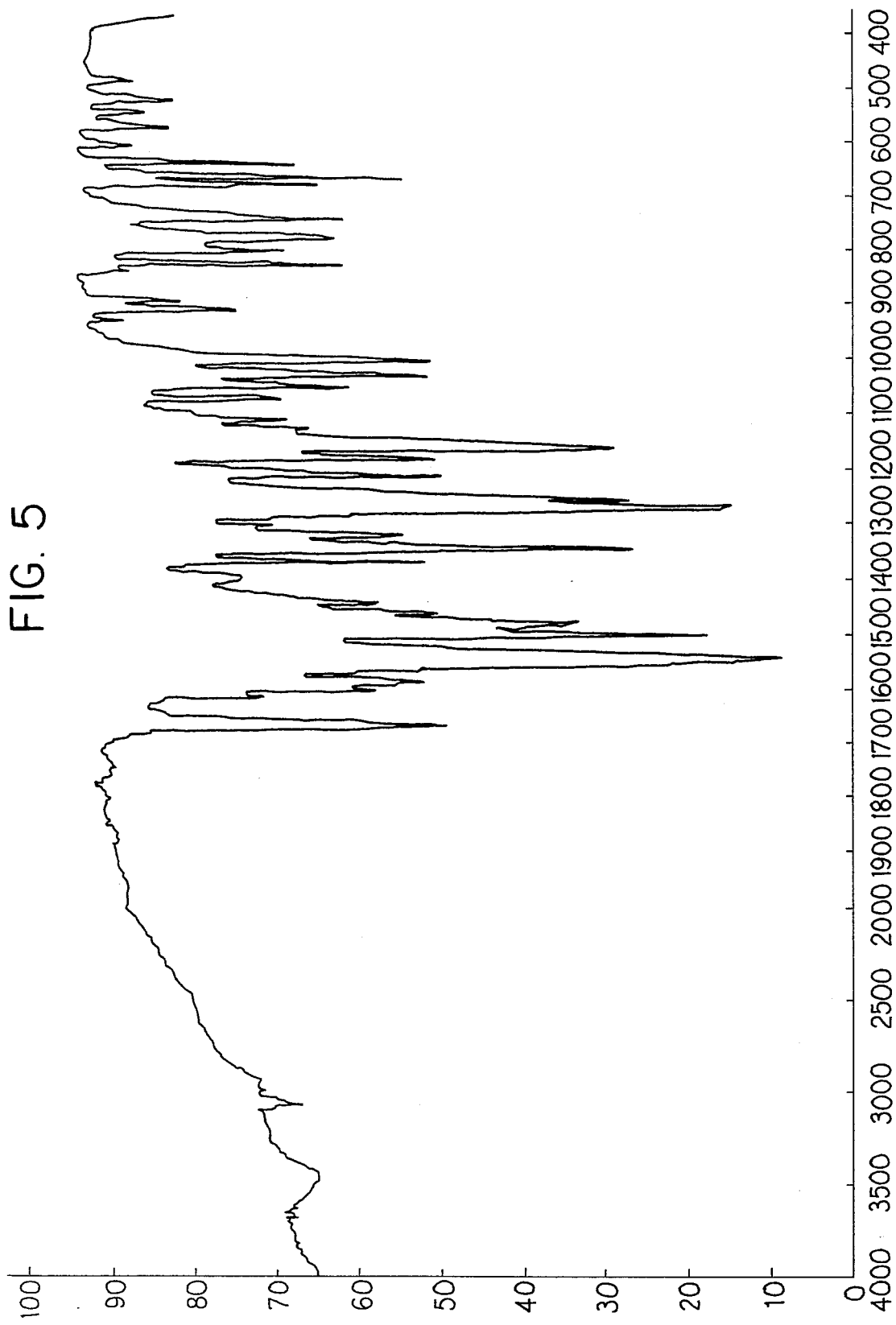
Figure 6:
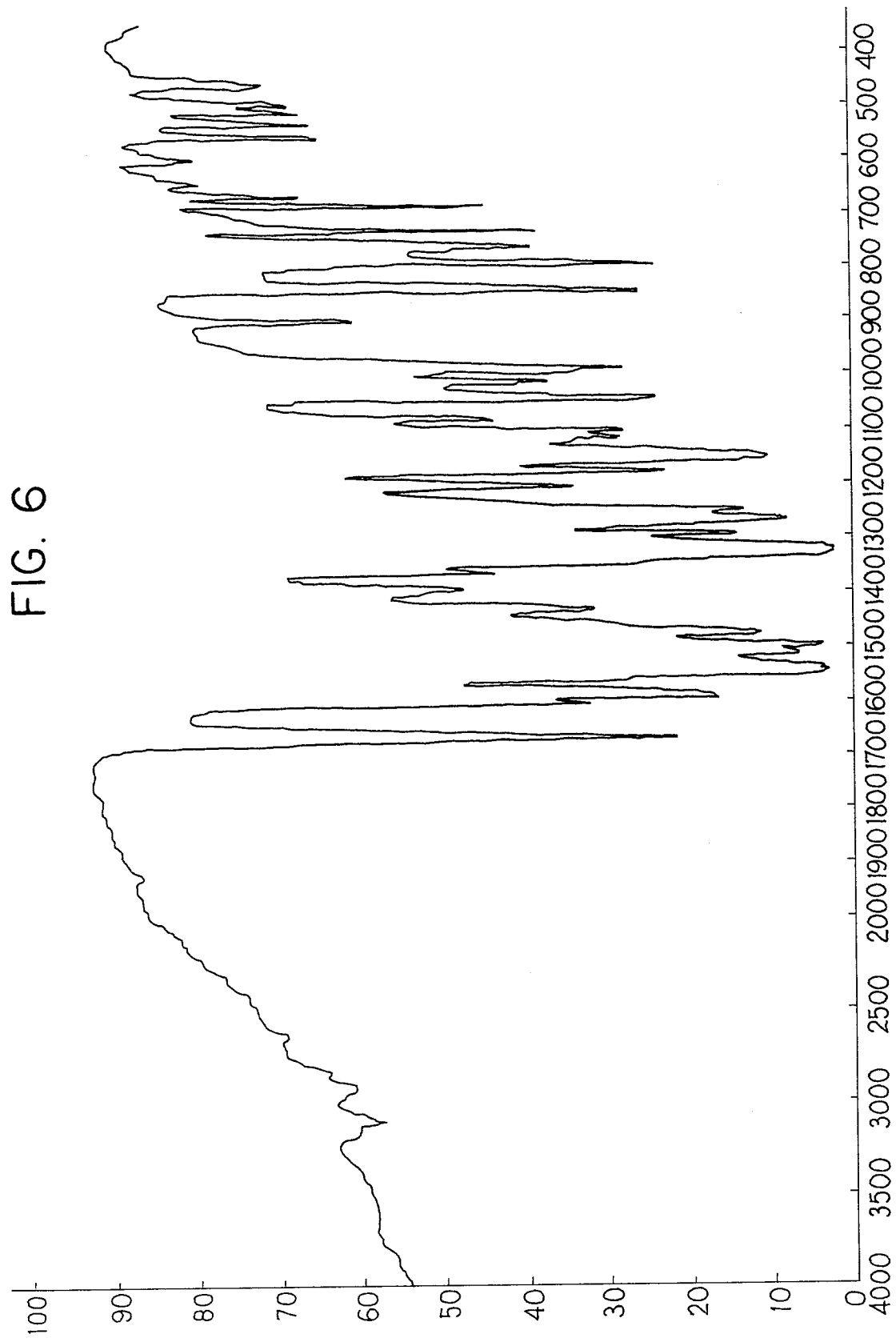

One embodiment of the present invention is a disazo compound expressed by the general formula (I)

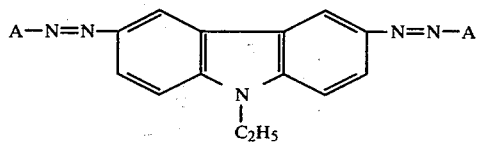

[wherein A represents

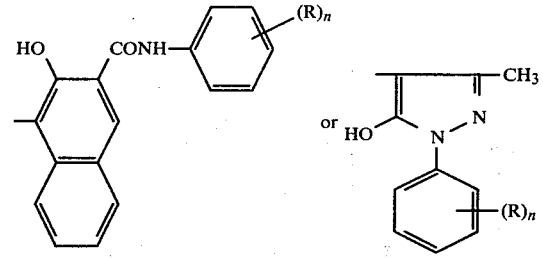

(wherein R represents alkyl radical, alkoxy radical, nitro radical, dialkylamino radical or halogen, n is 0 or an integer ranging from 1 to 3, R may be identical or different when n is an integer of 2 or 3)].

These novel disazo compounds are colored crystals at normal temperature, and concrete examples thereof are as shown in the following.

TABLE 1

| Structural formula of disazo compound (melting point) | Elemental analysis theoretical (%) | Elemental analysis experimental (%) | Infrared absorption spectrum | Color toner |
|---|---|---|---|---|
| (I) (250° C. or more) | C 66.7<br>H 3.9<br>N 14.6 | 66.2<br>3.6<br>14.2 | 1680 cm$^{-1}$ secondary amide | purple |
| (II) (250° C. or more) | C 74.5<br>H 4.6<br>N 12.7 | 74.0<br>4.7<br>12.3 | 1680 cm$^{-1}$ secondary amide | purple |
| (III) (250° C. or more) | C 72.0<br>H 4.7<br>N 11.8 | 71.8<br>5.0<br>11.6 | 1670 cm$^{-1}$ secondary amide | purple |

TABLE 1-continued

| Structural formula of disazo compound (melting point) | Elemental analysis | | Infrared absorption spectrum | Color toner |
|---|---|---|---|---|
| | theoretical (%) | experimental (%) | | |
| (IV) [structure with two CH₃-substituted phenyl amide groups on bis-azo-naphthol linked via N-ethyl diphenylamine] (250° C. or more) | C 74.9<br>H 4.9<br>N 12.2 | 75.1<br>4.8<br>12.0 | 1680 cm⁻¹ secondary amide | purple |
| (V) [structure with two 4-NO₂-phenyl amide groups on bis-azo-naphthol linked via N-ethyl diphenylamine] (250° C. or more) | C 66.7<br>H 3.9<br>N 14.6 | 66.5<br>4.0<br>14.3 | 1680 cm⁻¹ secondary amide | purple |
| (VI) [structure with two 4-Cl-phenyl amide groups on bis-azo-naphthol linked via N-ethyl diphenylamine] (250° C. or more) | C 68.4<br>H 3.9<br>N 11.6 | 68.5<br>4.0<br>11.3 | 1680 cm⁻¹ secondary amide | purple |

TABLE 1-continued

| Structural formula of disazo compound (melting point) | Elemental analysis | | Infrared absorption spectrum | Color toner |
|---|---|---|---|---|
| | theoretical (%) | experimental (%) | | |

(VII)

Structure: Disazo compound with two hydroxynaphthalene units bearing CONH-C₆H₄-N(CH₃)₂ groups, linked through an azo-biphenyl-azo system with N-C₂H₅ substituents.

(250° C. or more)

C 73.1 / 73.0
H 5.3 / 5.1
N 14.1 / 14.2

1670 cm⁻¹ secondary amide purple (VIII)

Structure: Disazo compound with two hydroxynaphthalene units bearing CONH-C₆H₃(OCH₃)₂ groups (2,5-dimethoxy), linked through an azo-biphenyl-azo system with N-C₂H₅ substituents.

(250° C. or more)

C 69.9 / 70.0
H 4.8 / 4.9
N 11.0 / 11.0

1675 cm⁻¹ secondary amide purple

TABLE 1-continued

| Structural formula of disazo compound (melting point) | Elemental analysis theoretical (%) | experimental (%) | Infrared absorption spectrum | Color toner |
|---|---|---|---|---|
| (IX) (250° C. or more) | C 64.9<br>H 4.3<br>N 10.2 | C 64.3<br>H 4.0<br>N 9.9 | 1680 cm$^{-1}$ secondary amide | purple |
| (X) (250° C. or more) | C 64.9<br>H 4.3<br>N 10.2 | C 64.5<br>H 4.0<br>N 10.5 | 1680 cm$^{-1}$ secondary amide | purple |

TABLE 1-continued

| Structural formula of disazo compound (melting point) | Elemental analysis | | | Infrared absorption spectrum | Color toner |
|---|---|---|---|---|---|
| | | theoretical (%) | experimental (%) | | |
| (XI) [disazo structure with phenyl groups, N-C₂H₅, and CH₃/phenyl hydrazone termini] (Decomposition point 225° C. or more) | C<br>H<br>N | 68.6<br>4.9<br>21.2 | 68.7<br>5.1<br>21.4 | | red |
| (XII) [disazo structure with phenyl groups, N-C₂H₅, and CH₃/p-nitrophenyl hydrazone termini] (250° C. or more) | C<br>H<br>N | 59.6<br>4.0<br>22.5 | 59.4<br>3.7<br>22.3 | | reddish brown |

In this connection, the infrared absorption spectrum (KBr Tab.) of Compounds (I), (II), (III), (IV), (XI) and (XII) among these disazo compounds are as shown in FIGS. 1, 2, 3, 4, 5 and 6, respectively.

Disazo compounds expressed by the above mentioned general formula (I) can be prepared by the process described below. That is to say, another embodiment of the present invention is a process of preparation of the foregoing novel disazo compounds, which process comprises diazotizing 3,6-diamino-9-ethyl carbazole expressed by

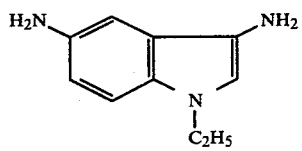

into a tetrazonium salt expressed by

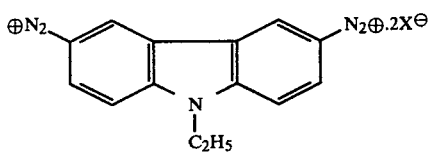

(wherein X anionic functional radical) and reacting this salt with a compound expressed by the following general formula (a)

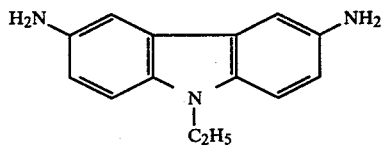

[in both (a) and (b) herein, R represents alkyl radical, alkoxy radical, nitro radical dialkylamino radical or halogen, n is 0 or an integer ranging from 1 to 3, R may be identical or different when n is an integer of 2 or 3)].

In this process of preparation, said diazotization of 3,6-diamino-9-ethyl carbazole is effected by adding an aqueous solution of sodium nitrite thereto within a dilute inorganic acid such as dilute hydrochloric acid or dilute sulfuric acid at a temperature of $-10°$ C. to $10°$ C. This diazotization reaction completes in 30 minutes to 3 hours. Further, it is desirable to precipitate tetrazonium salt by adding borofluoric acid or the like to the reactant mixture and then filter said salt, thereby obtaining crystals.

Subsequently, by adding the foregoing compound (a) or (b) (also called coupling ingredient) to this tetrazonium salt, coupling reaction is effected between the tetrazonium salt and coupling ingredient. Practically speaking, this reaction is effected through the procedure comprising preparing a solution by mixing the tetrazonium salt and coupling ingredient with an organic solvent such as N,N-dimethyl formamide, methyl sulfoxide, etc. and adding to this solution dropwise an aqueous solution of alkali such as sodium acetate at a temperature of about $-10°$ C. to $10°$ C. This reaction completes in 5 minutes to 3 hours.

Still another embodiment of the present invention is an application of the thus obtained disazo compounds as well as analogues thereof to electrophotographic sensitive materials. That is to say, the photosensitive material according to the present invention is an electrophotographic sensitive material which comprises a conductive support and a photosensitive layer formed thereon, said photosensitive layer containing a disazo pigment, as an effective ingredient, which is expressed by the general formula (II)

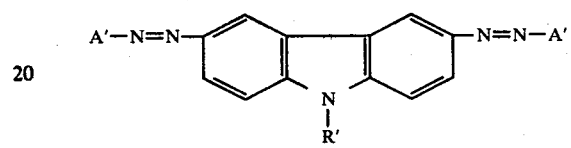

[wherein R' represents a member selected from the group consisting of hydrogen, ethyl radical, chloroethyl radical and hydroxyethyl radical, A' represents a member selected from the group consisting of

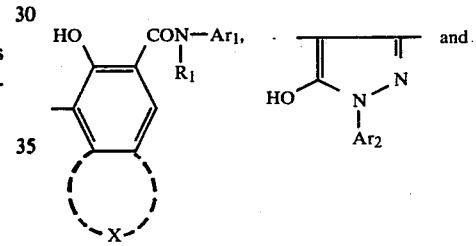

(wherein X represents a member selected from the group consisting of aromatic rings such as benzene ring, naphthalene ring, etc., heterocyclic rings such as indole ring, carbazole ring, benzofuran ring, etc. and their substituents, $Ar_1$ represents a group consisting of aromatic rings such as benzene ring, naphthalene ring, etc., heterocyclic rings such as dibenzofuran ring, etc. and their substituents, $Ar_2$ and $Ar_3$ represent respectively a member selected from the group consisting of aromatic rings such as benzene ring, naphthalene ring, etc. and their substituents, $R_1$ and $R_3$ represent respectively a member selected from the group consisting of hydrogen, lower alkyl radical or phenyl radical and their substituents, and $R_2$ represents a member selected from the group consisting of lower alkyl radical, carboxyl radical and their esters)].

Shown hereunder in terms of structural formulae are concrete examples of the compound expressed by the foregoing general formula (II) which are useful in the electrophotographic sensitive materials according to the present invention.

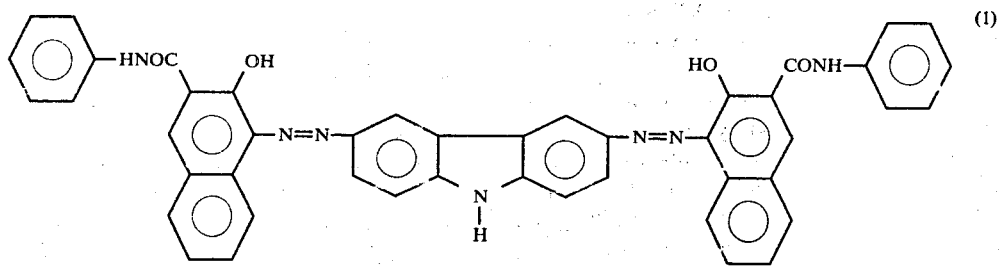
(1)
The portion
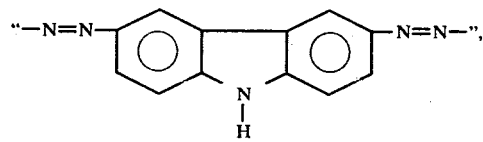
which is common in the formulae representing Compounds No. (2) to No. (66), shall hereinafter be replaced by "—Y—".
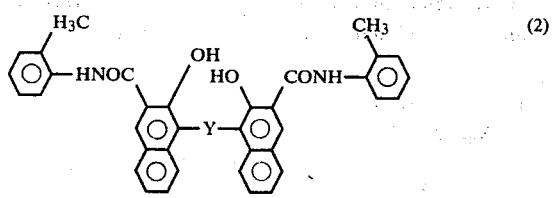
(2)
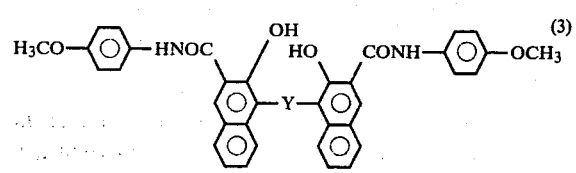
(3)
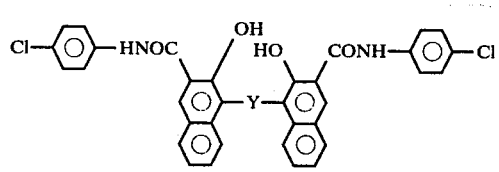
(4)
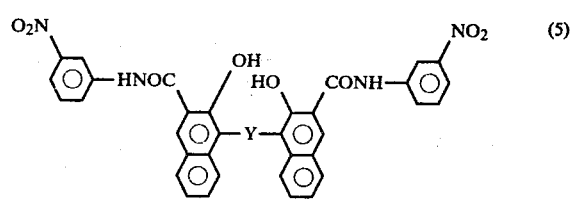
(5)
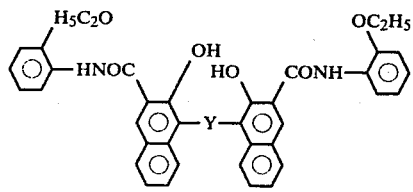
(6)
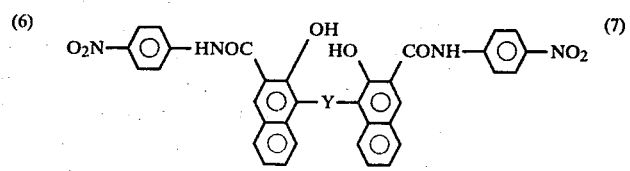
(7)
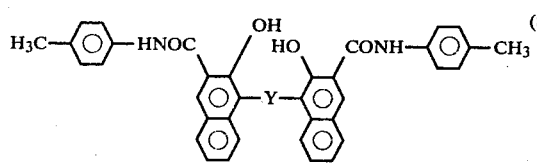
(8)
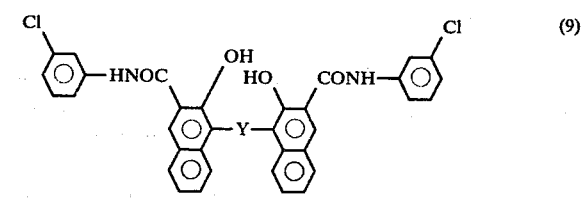
(9)
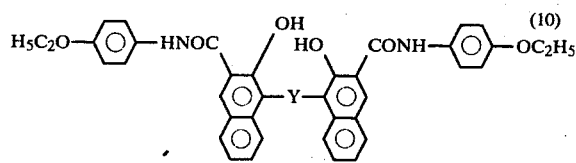
(10)
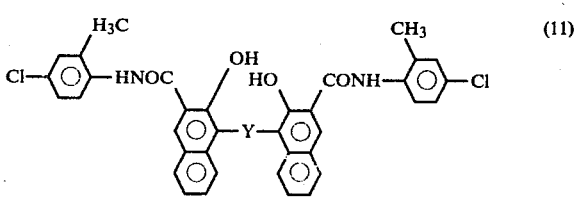
(11)

-continued
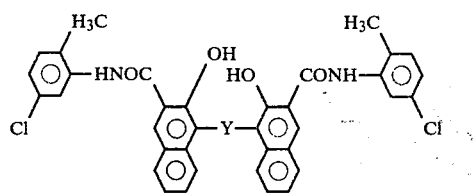 (12)
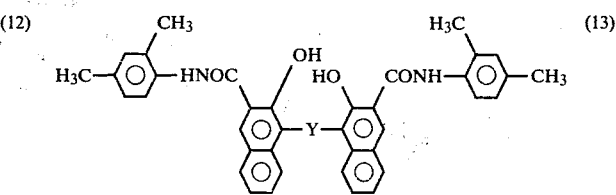 (13)
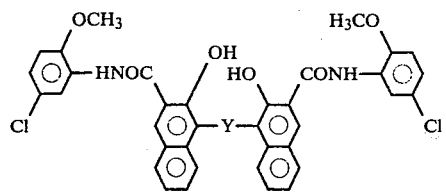 (14)
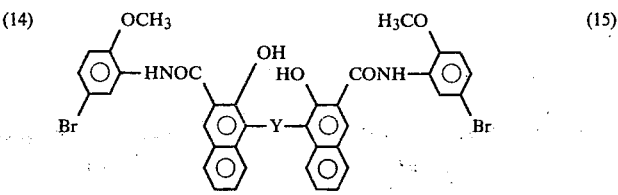 (15)
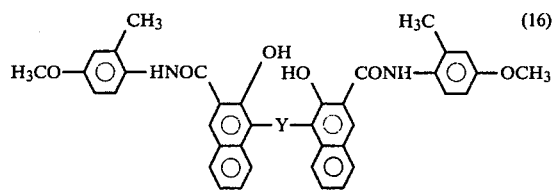 (16)
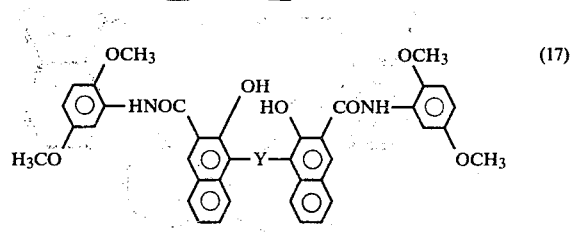 (17)
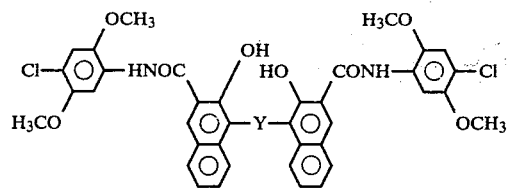 (18)
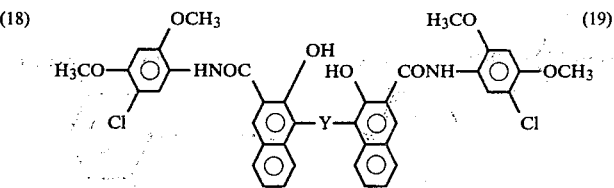 (19)
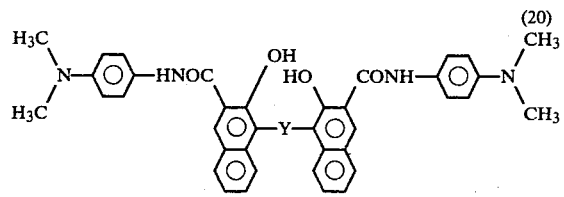 (20)
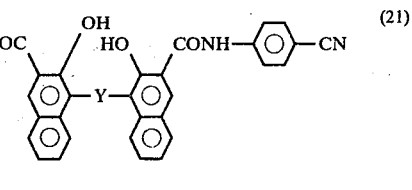 (21)
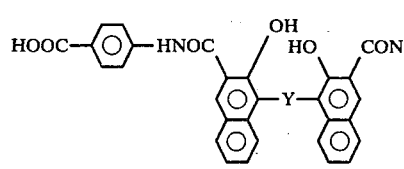 (22)
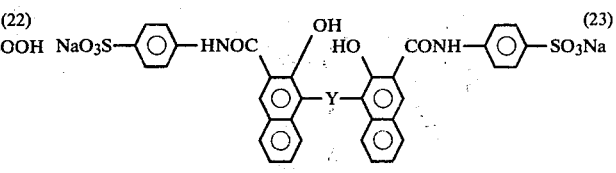 (23)
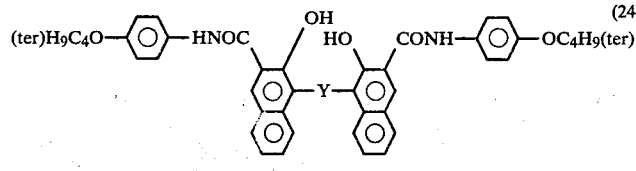 (24)
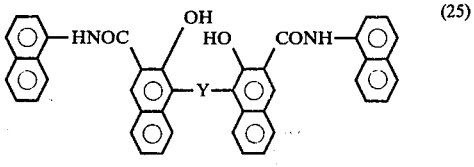 (25)
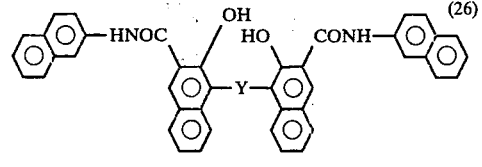 (26)
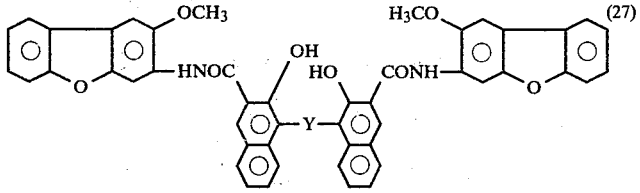 (27)

-continued
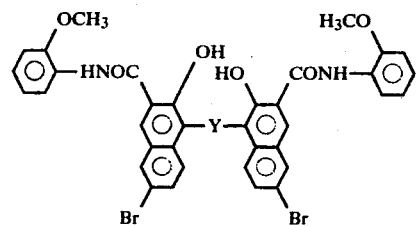 (28)
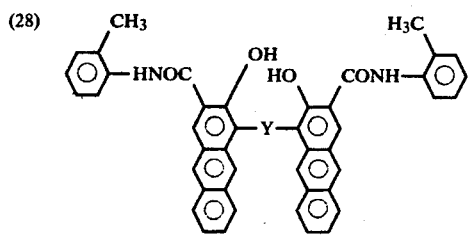 (29)
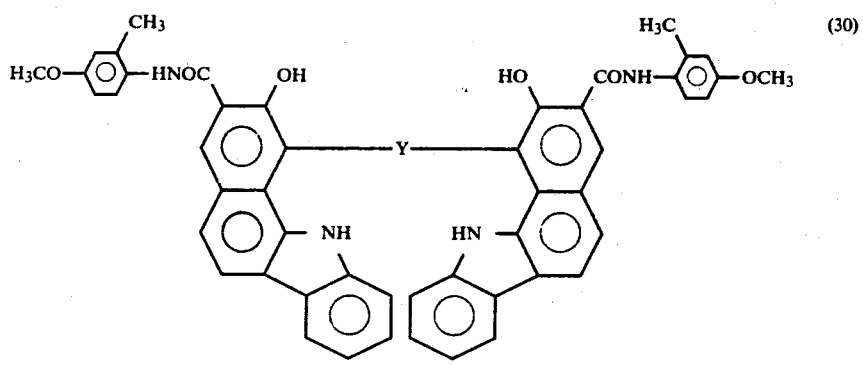 (30)
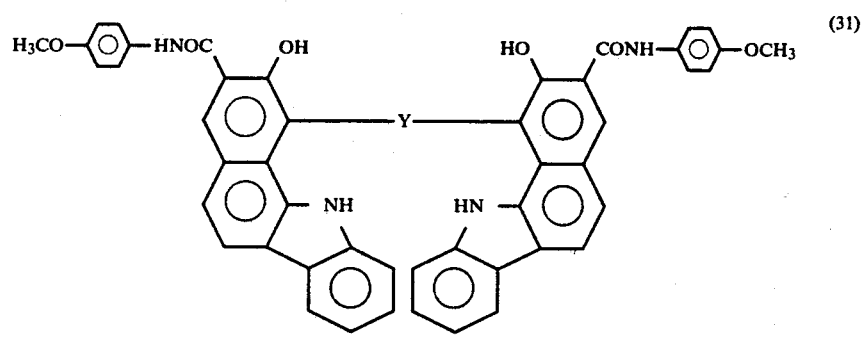 (31)
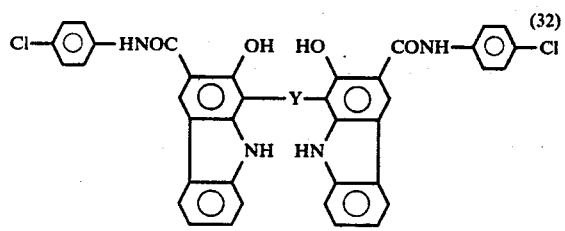 (32)
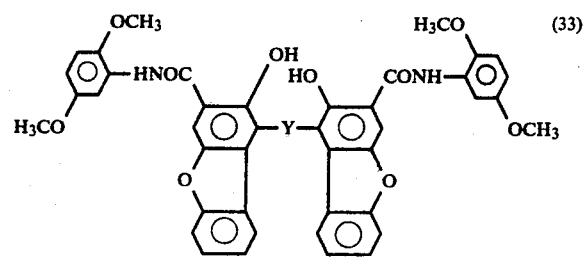 (33)
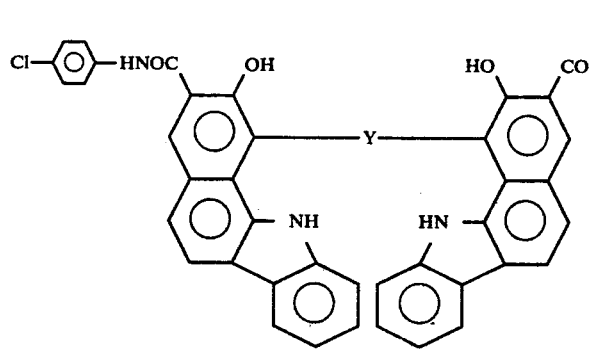 (34)
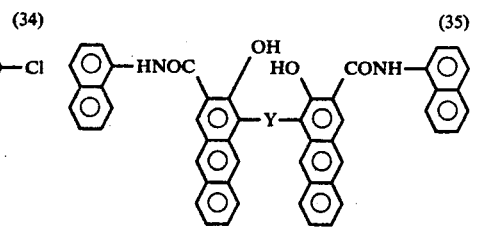 (35)

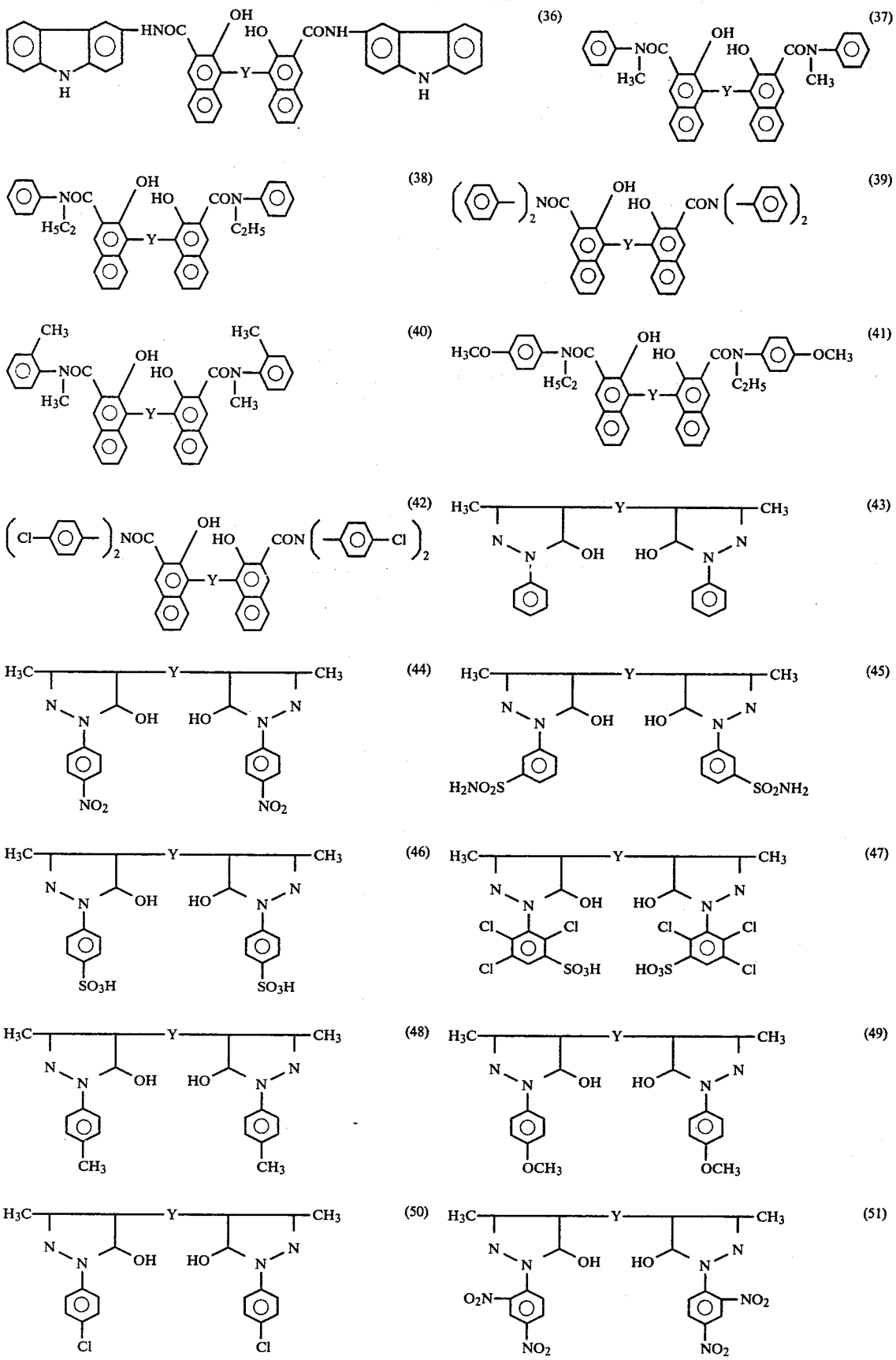

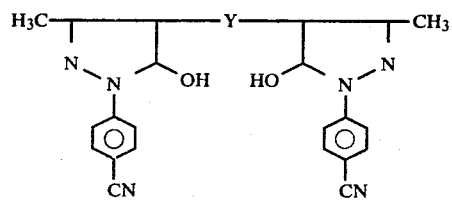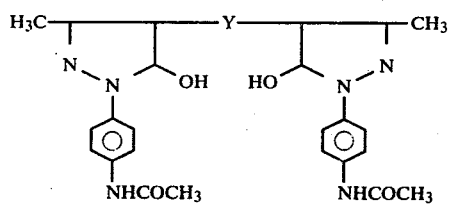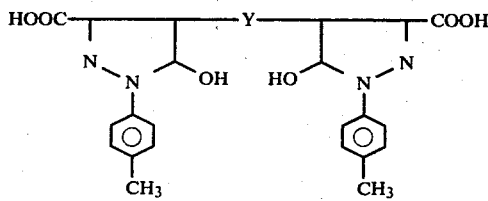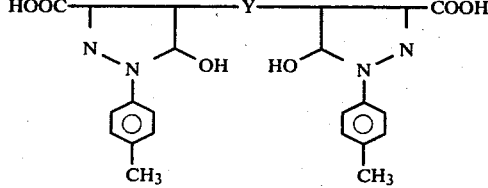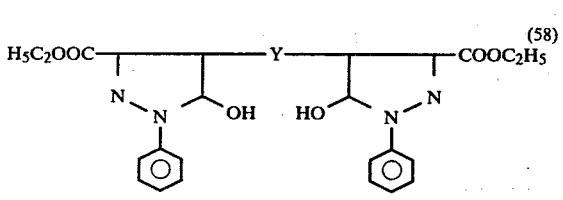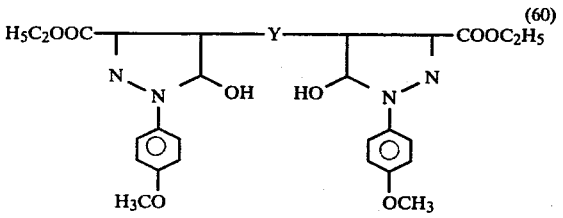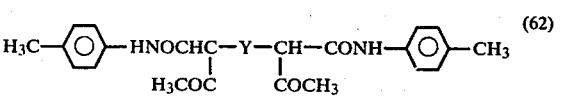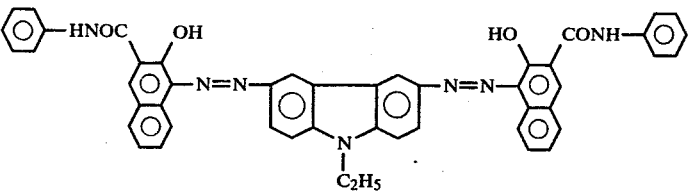

The portion
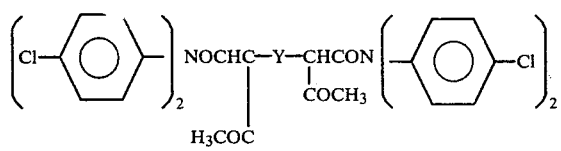
which is common in the formulae representing Compounds No. (68) to No. (132), shall hereinafter be replaced by "—Y'—".
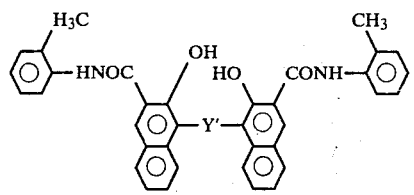
(68)
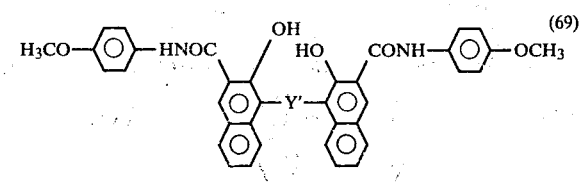
(69)
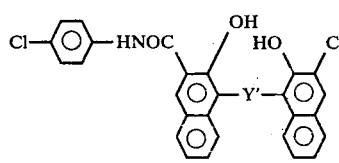
(70)
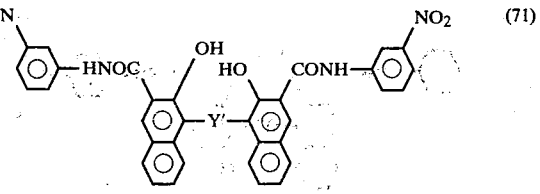
(71)
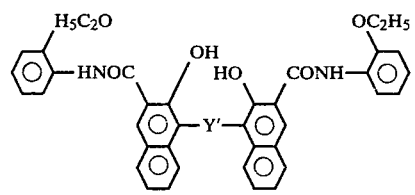
(72)
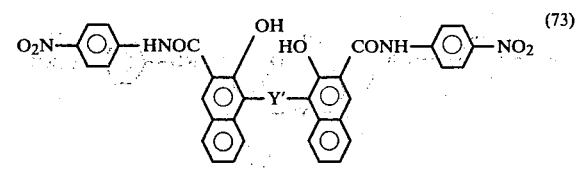
(73)
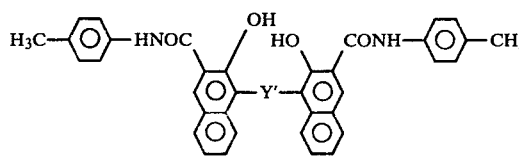
(74)
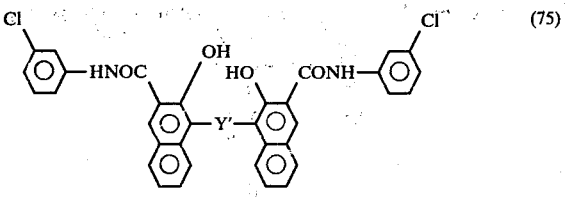
(75)
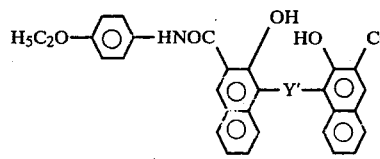
(76)
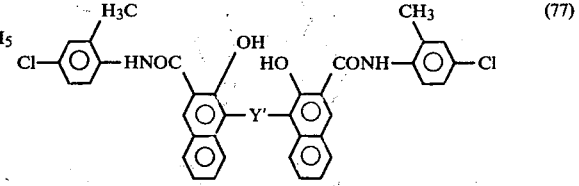
(77)
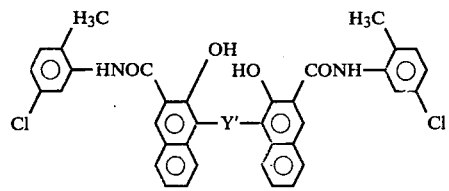
(78)
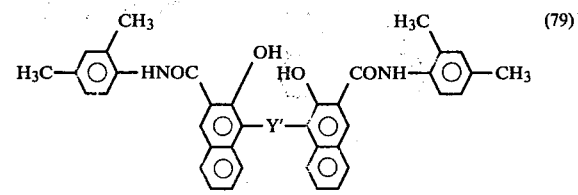
(79)
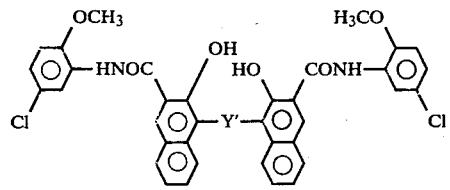
(80)
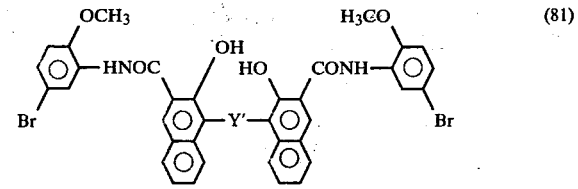
(81)

-continued
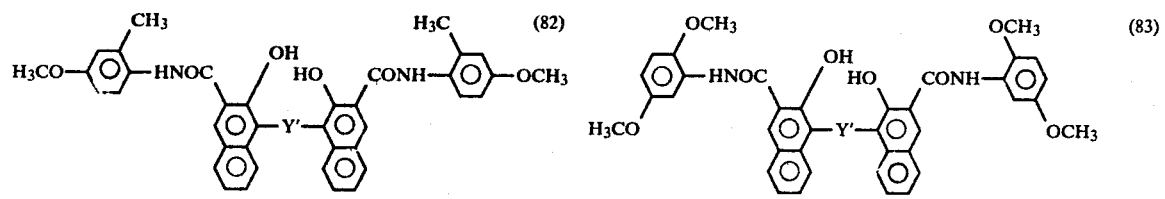
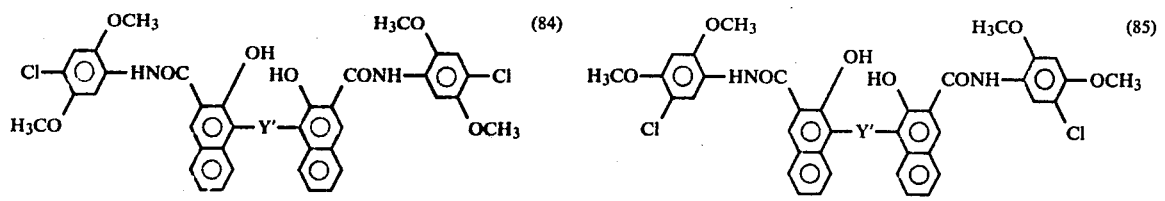
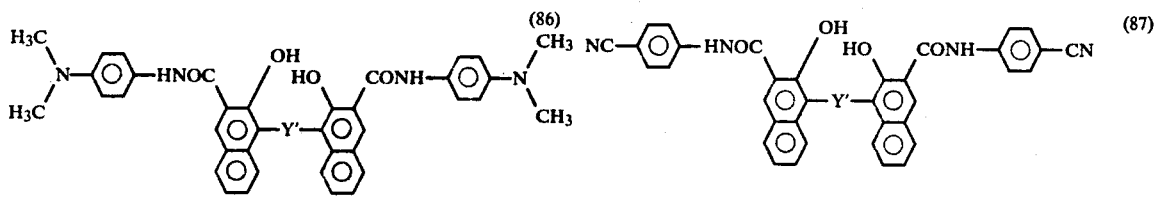
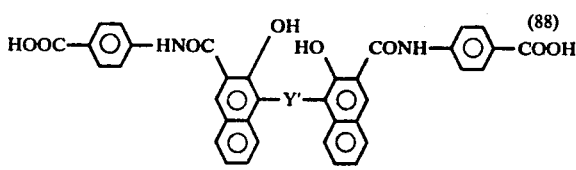
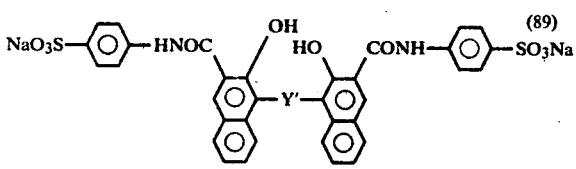
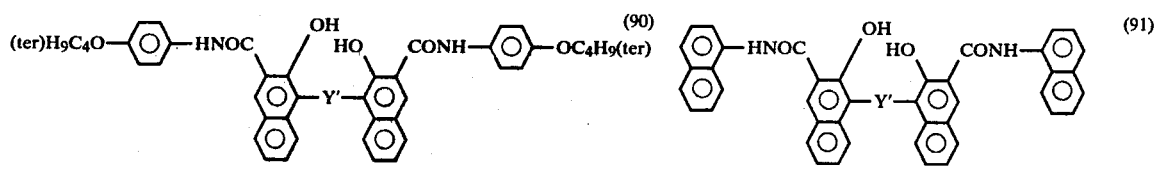
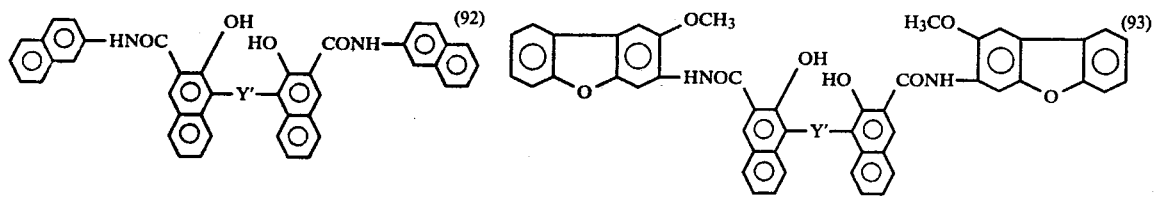
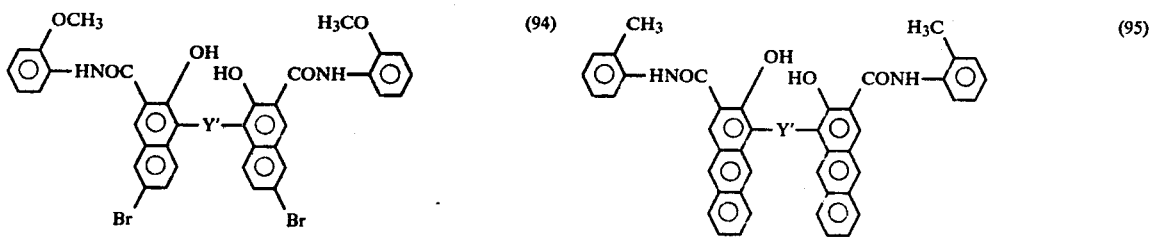

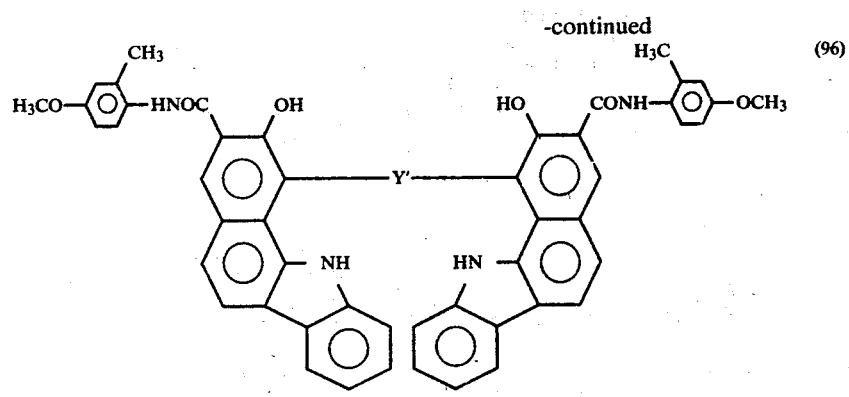
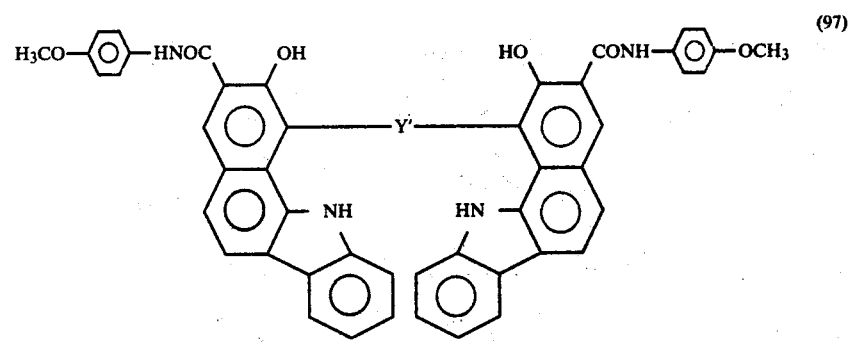
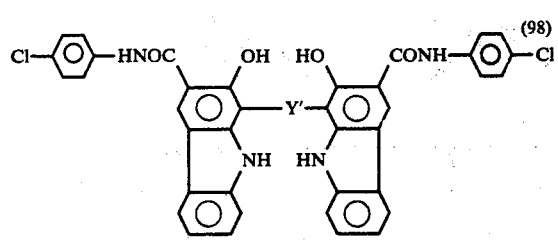
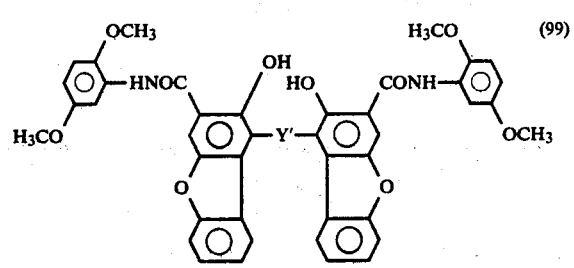
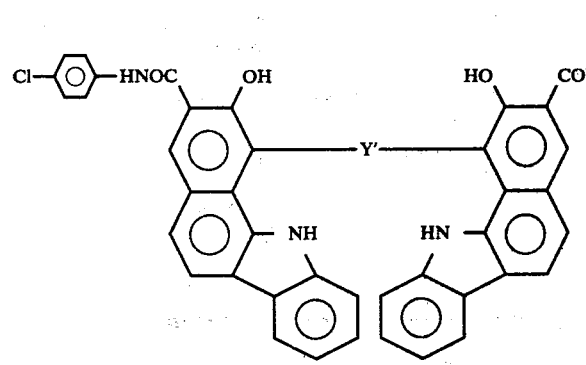
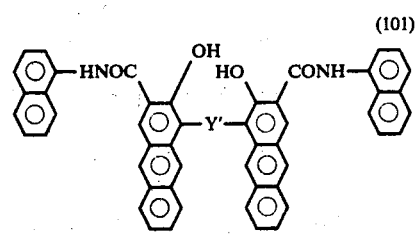
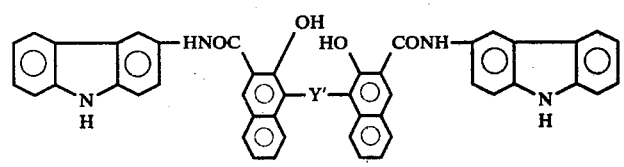
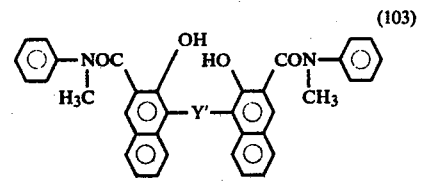
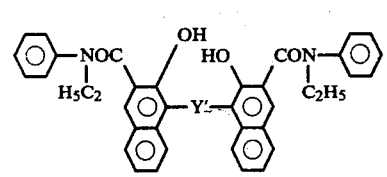
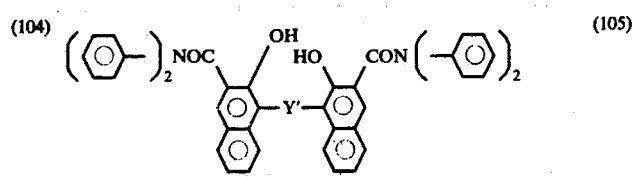

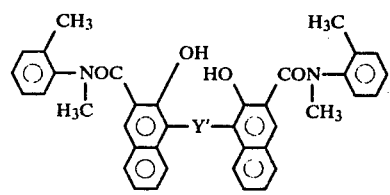(105)
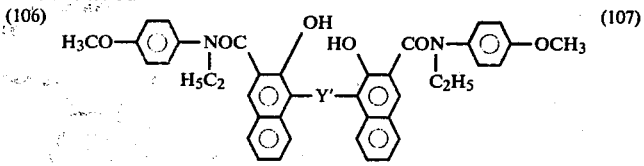(106)
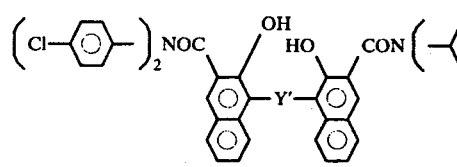(106)
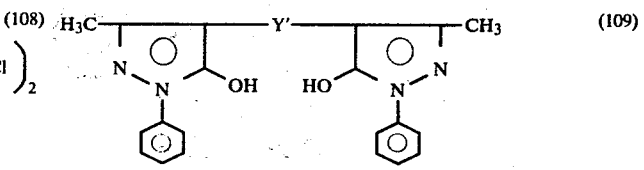(107)
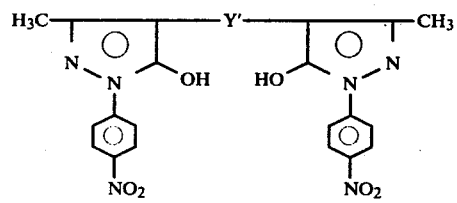(108)
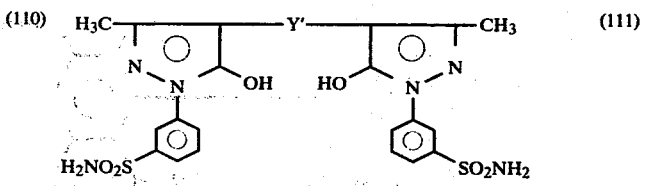(109)
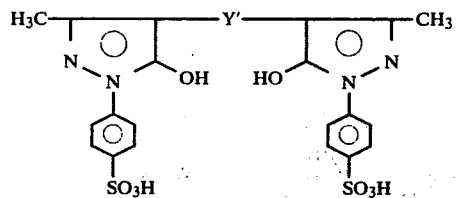(110)
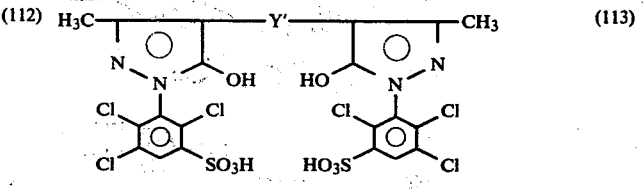(111)
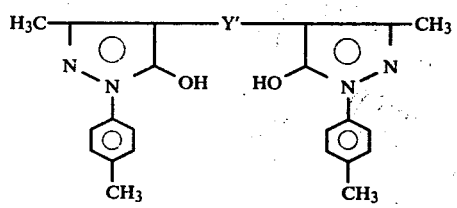(112)
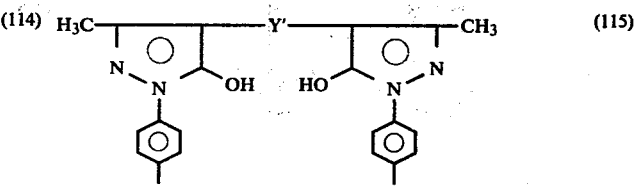(113)
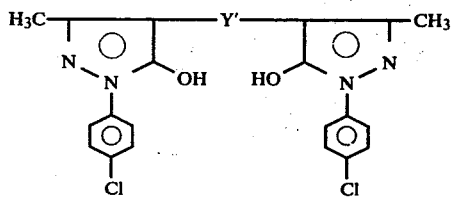(114)
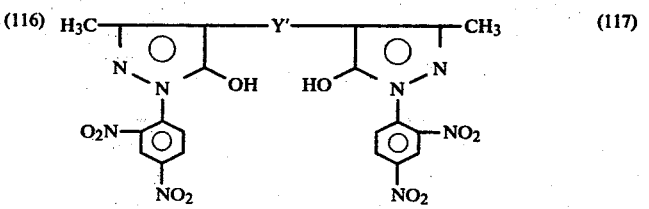(115)
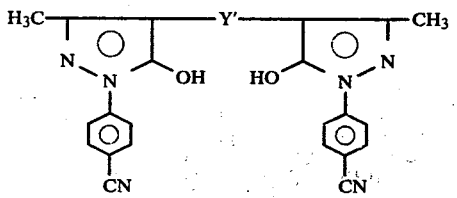(116)
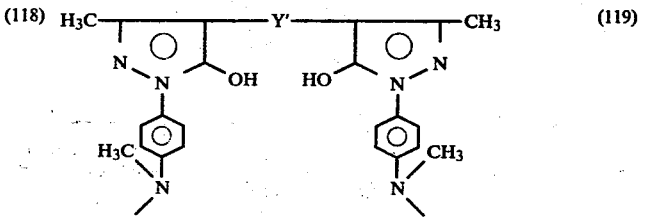(117)
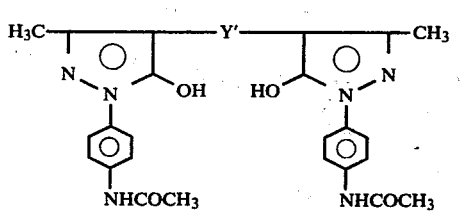(118)
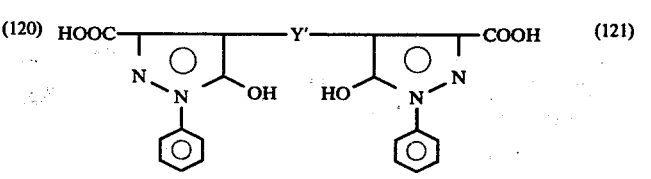(119)
(120)
(121)

-continued
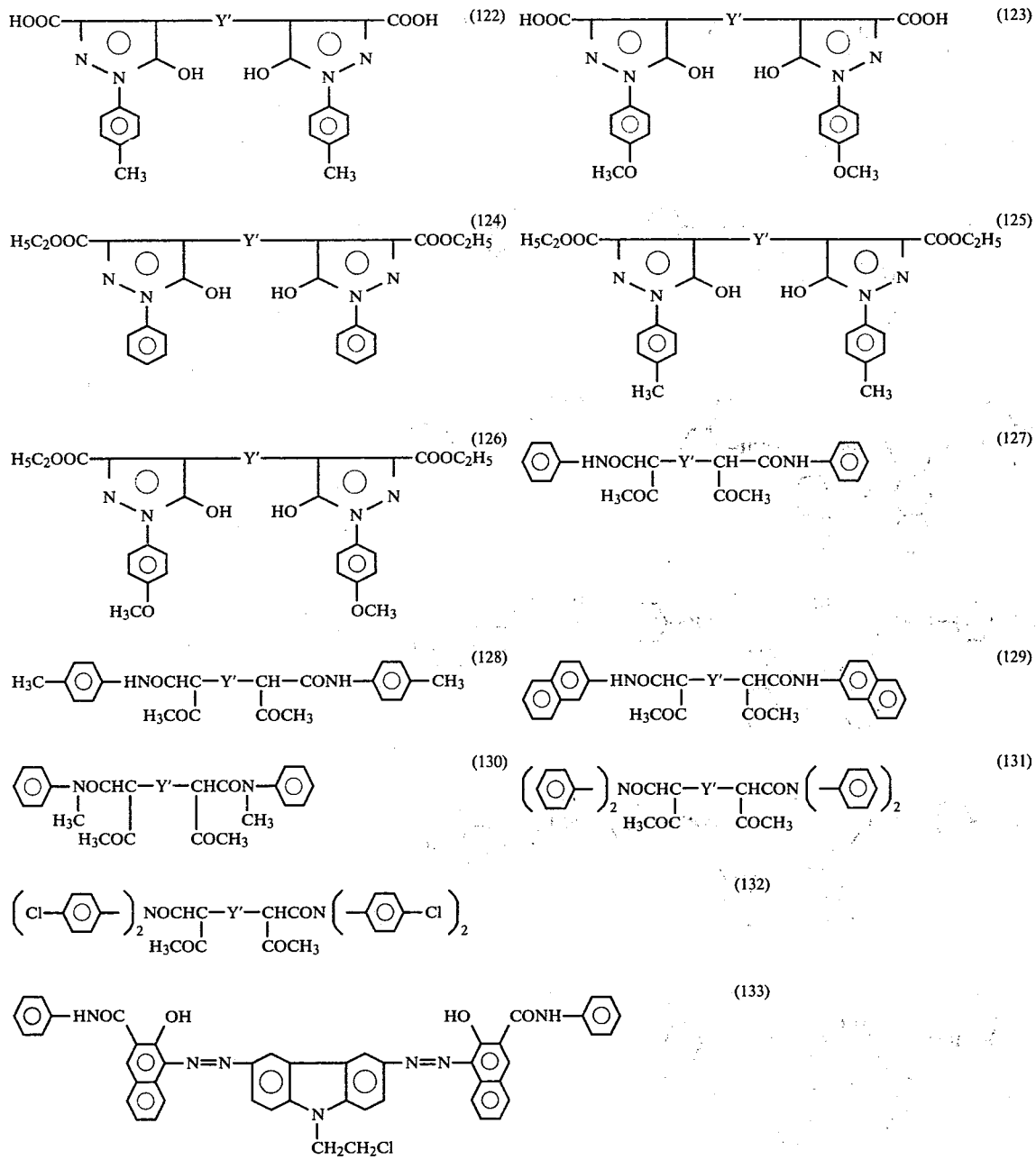
The portion
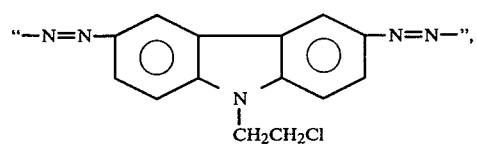
which is common in the formulae representing Compounds No. (134) to No. (198), shall hereinafter be replaced by "—Y″—".

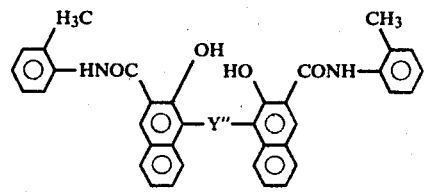 (134)
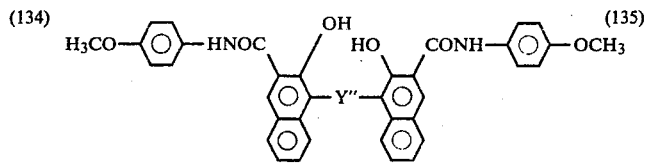 (135)
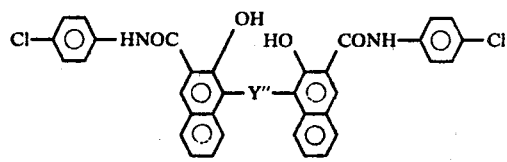 (136)
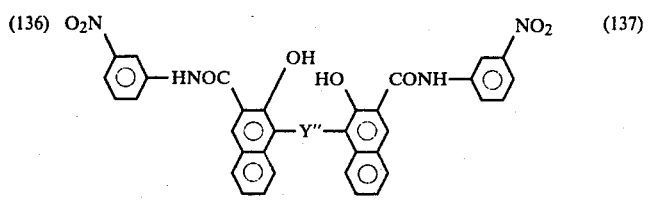 (137)
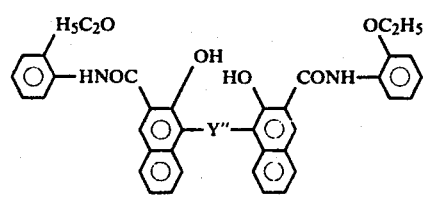 (138)
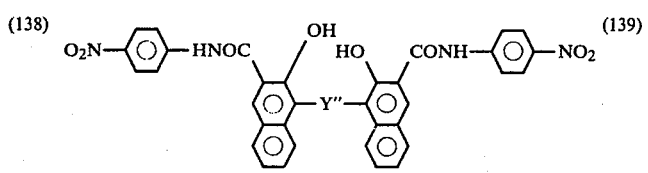 (139)
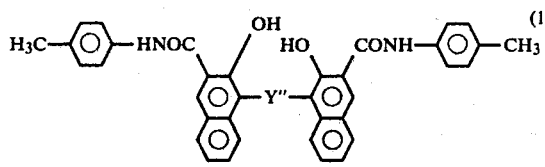 (140)
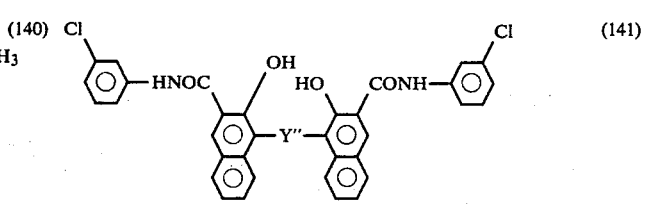 (141)
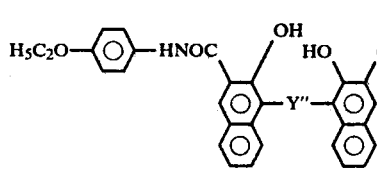 (142)
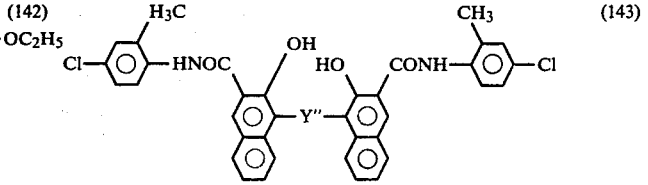 (143)
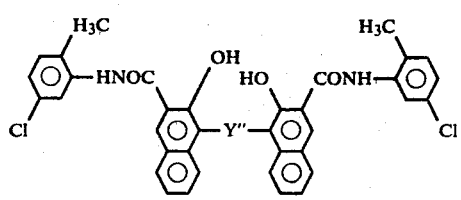 (144)
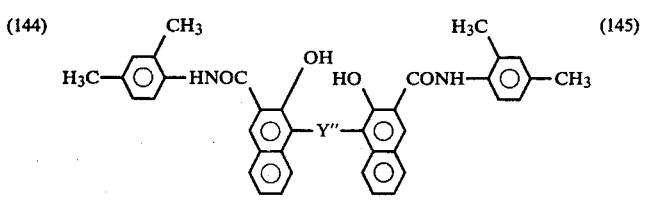 (145)
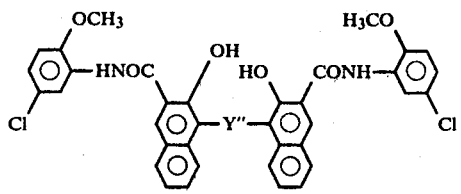 (146)
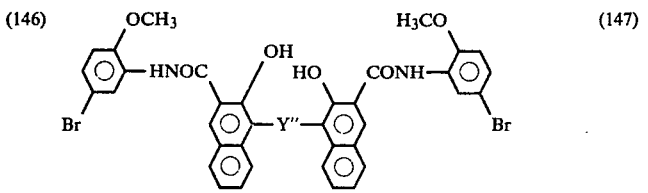 (147)
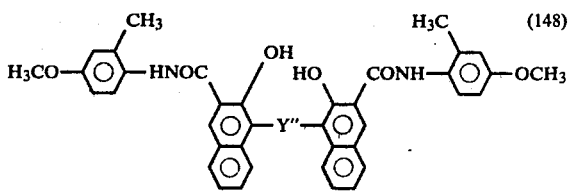 (148)
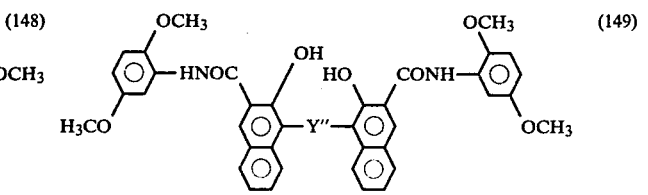 (149)

-continued
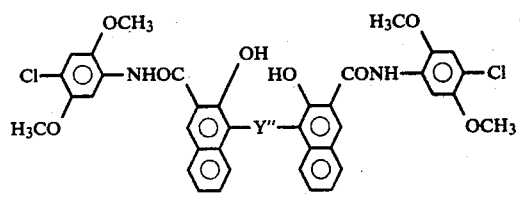 (150)
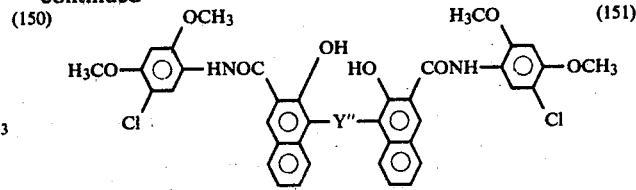 (151)
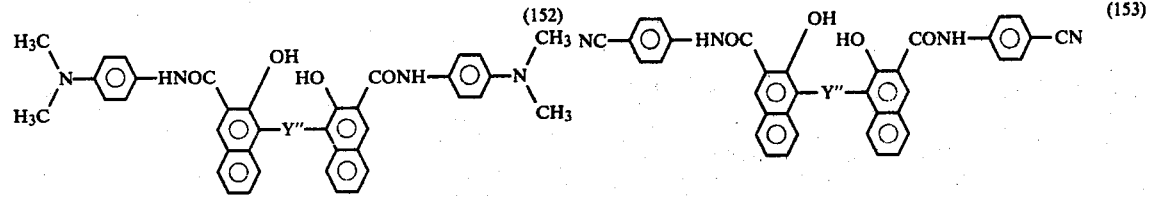 (152) (153)
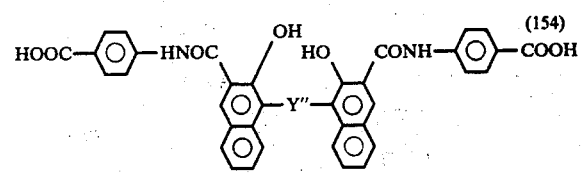 (154)
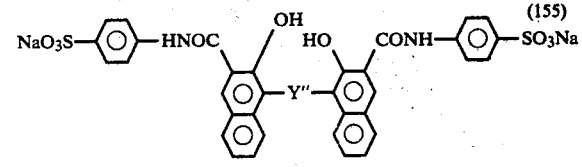 (155)
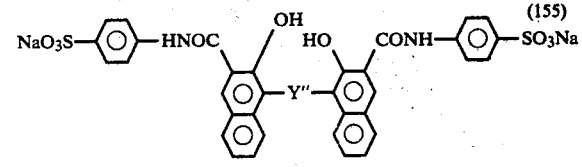 (156)
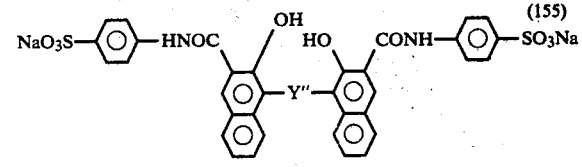 (157)
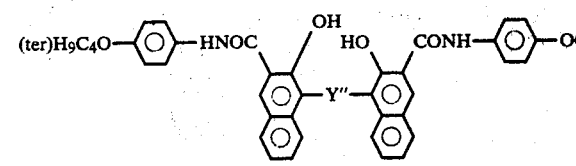 (158) (159)
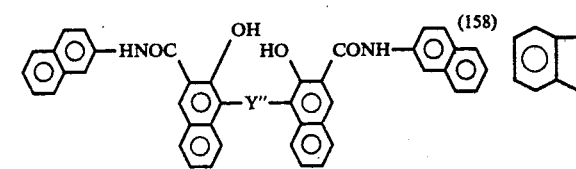 (160)
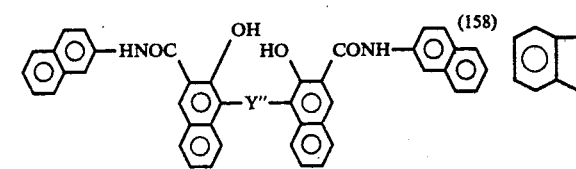 (161)
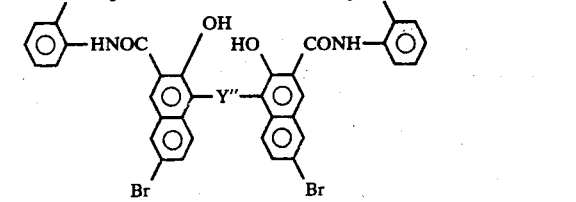 (162)

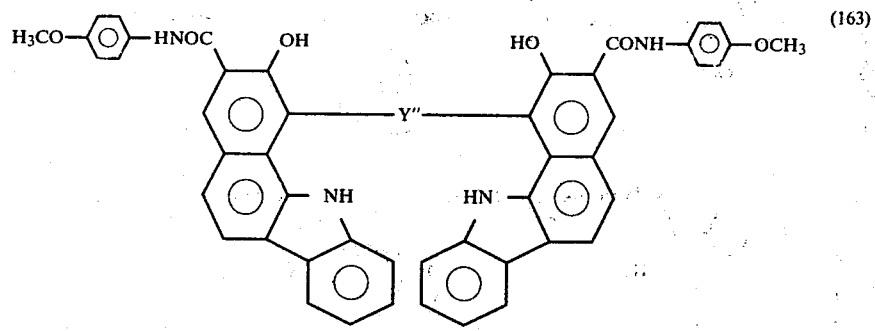
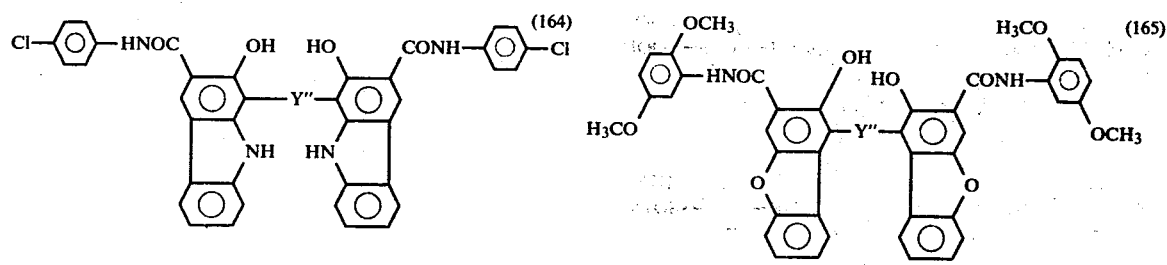
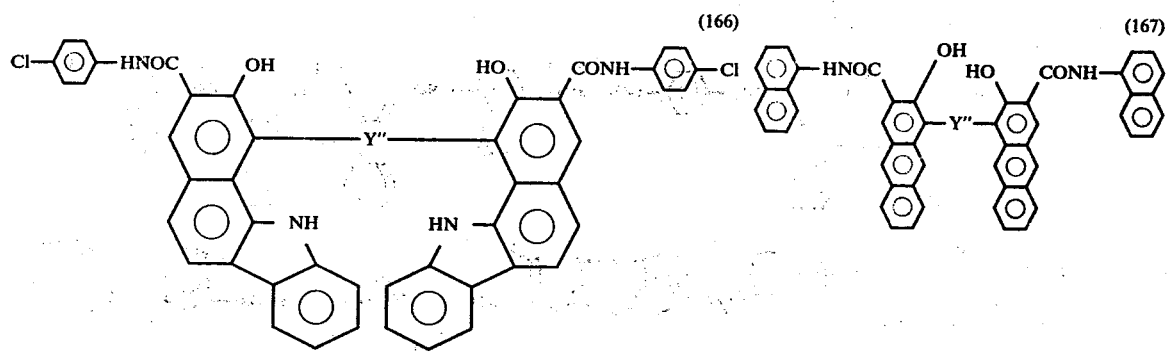
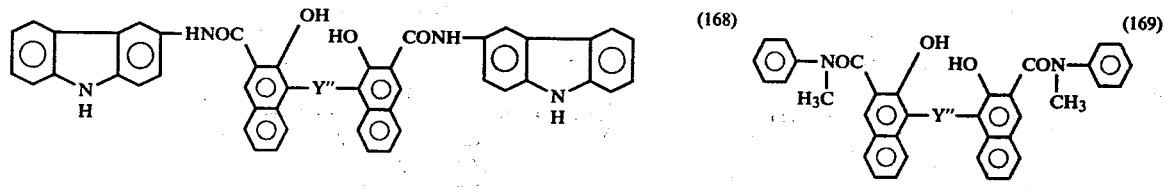
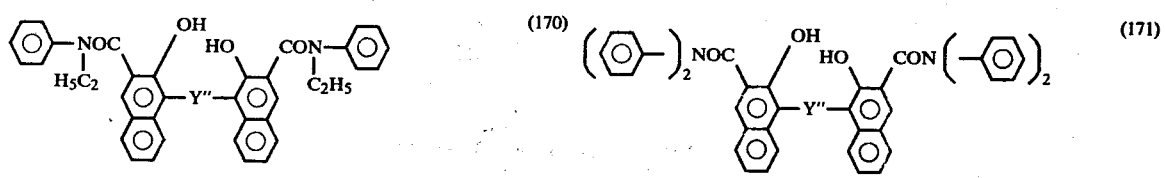
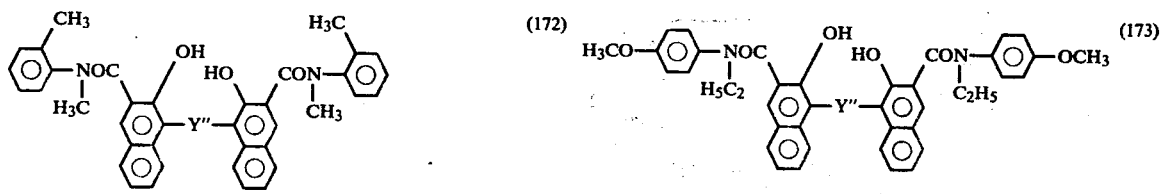

-continued
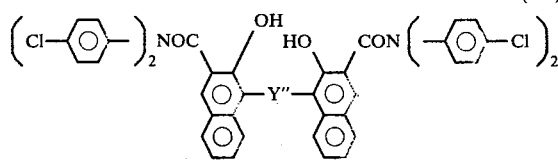 (174)
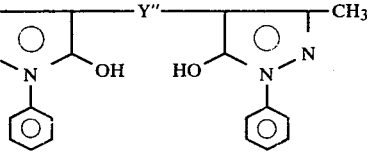 (175)
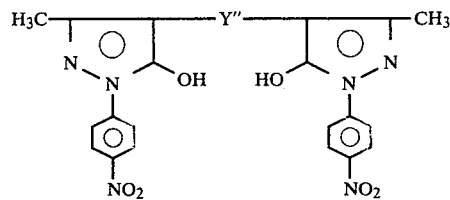 (176)
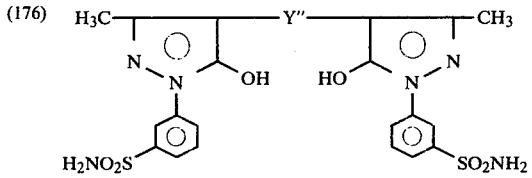 (177)
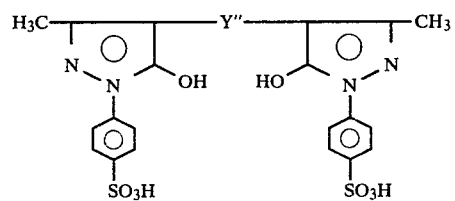 (178)
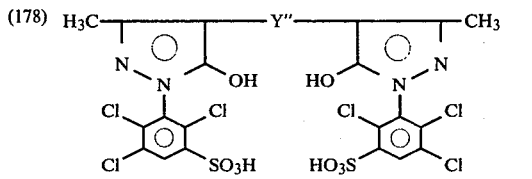 (179)
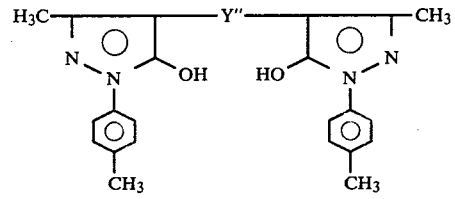 (180)
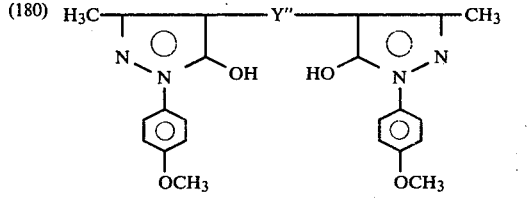 (181)
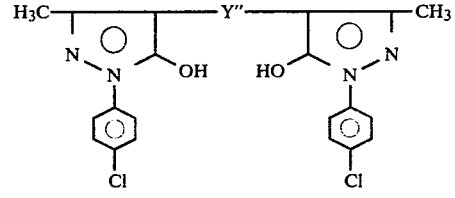 (182)
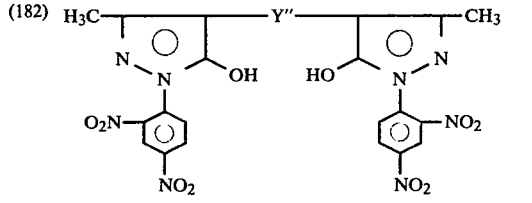 (183)
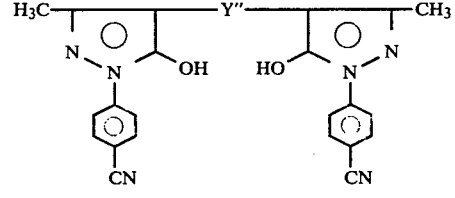 (184)
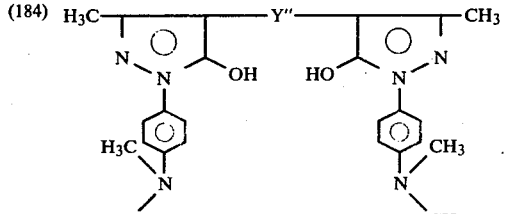 (185)
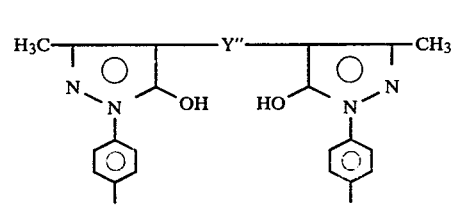 (186)
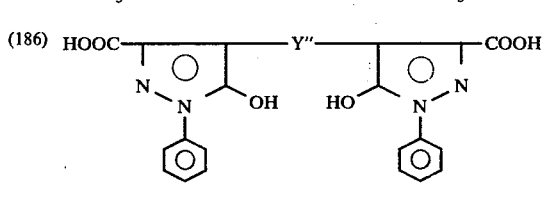 (187)
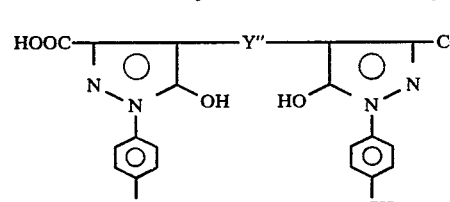 (188)
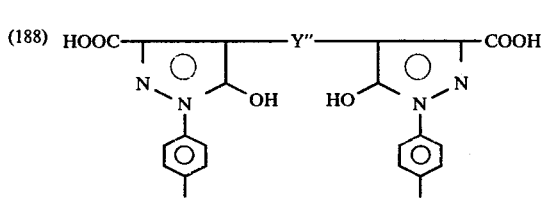 (189)

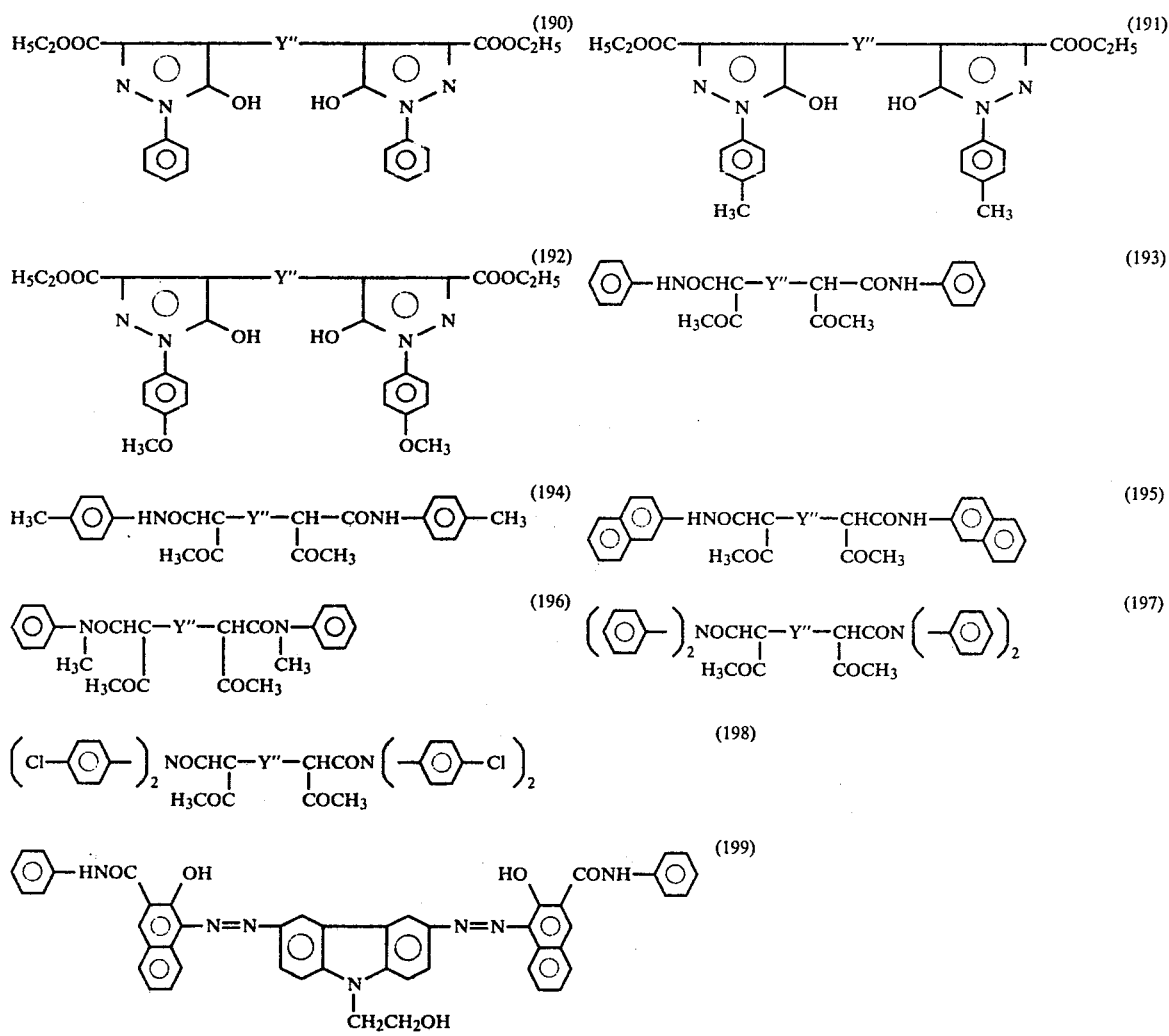
The portion
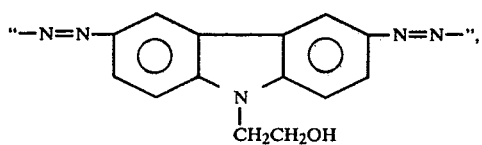
which is common in the formulae representing Compounds No. (200) to No. (264), shall hereinafter be replaced by "—Y'''—".
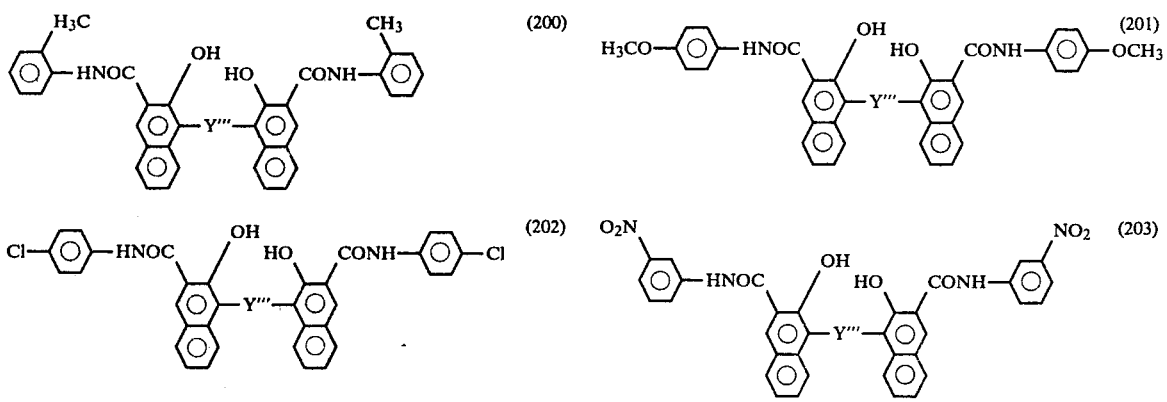

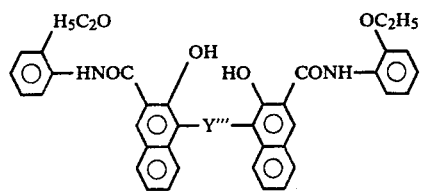 (204)
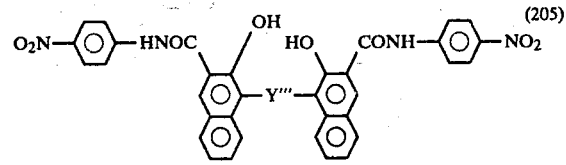 (205)
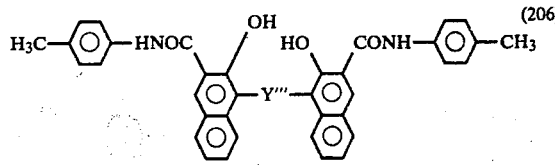 (206)
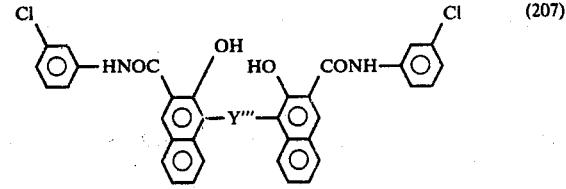 (207)
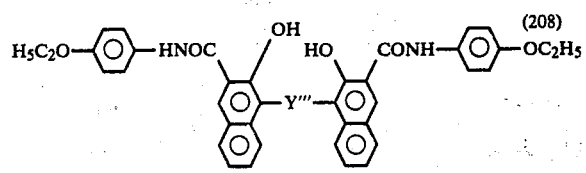 (208)
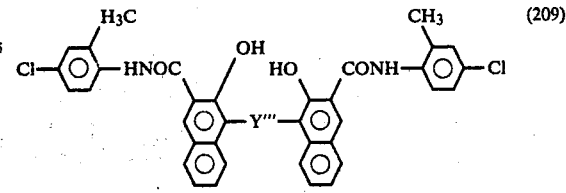 (209)
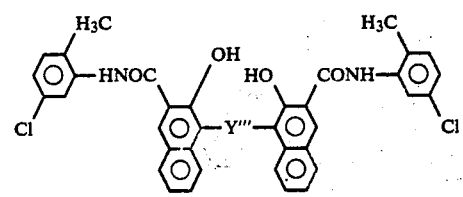 (210)
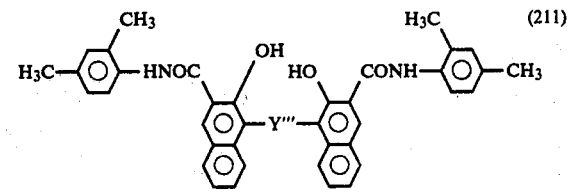 (211)
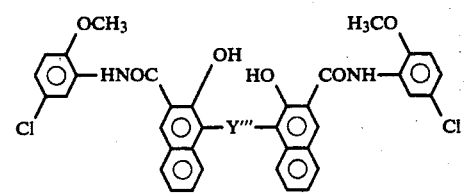 (212)
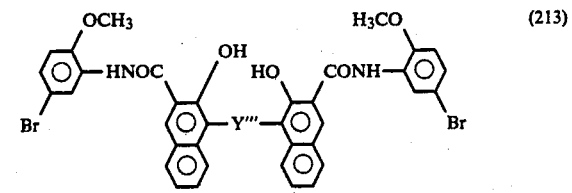 (213)
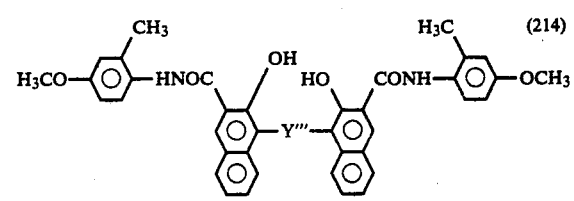 (214)
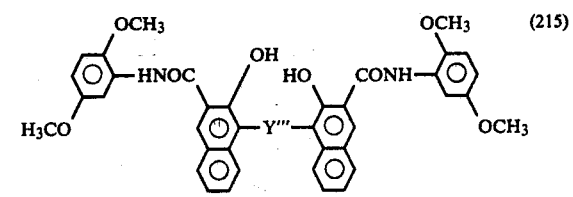 (215)
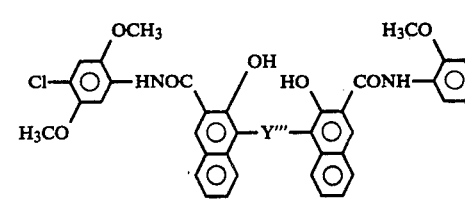 (216)
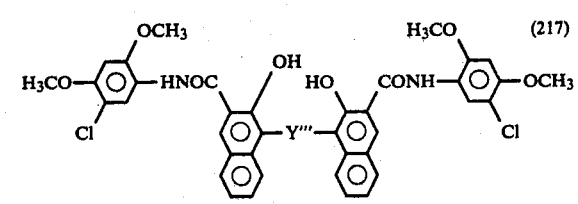 (217)
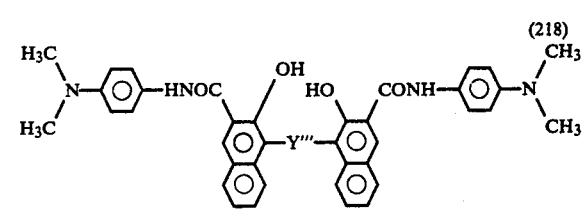 (218)
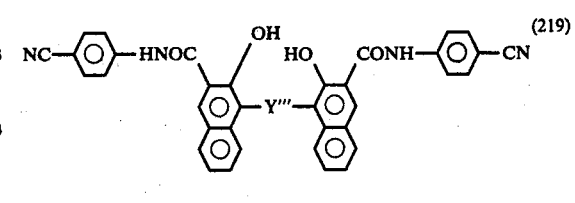 (219)

-continued
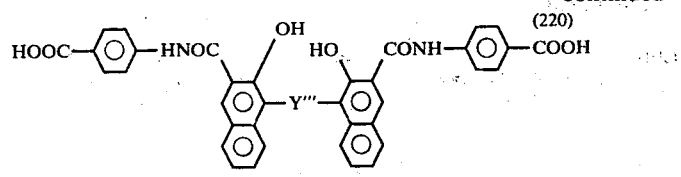
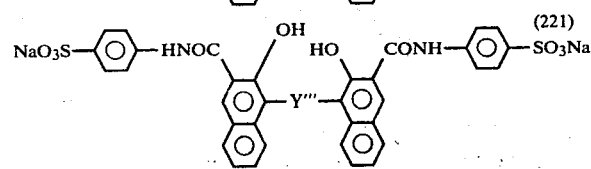
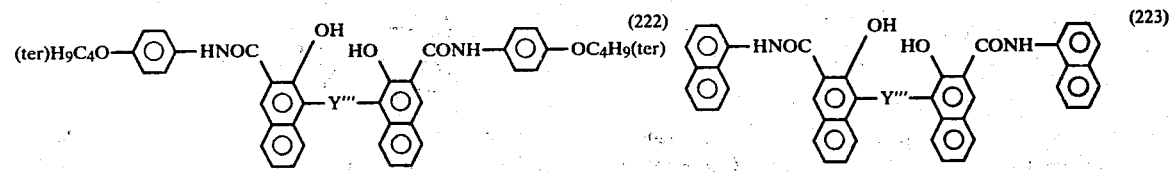
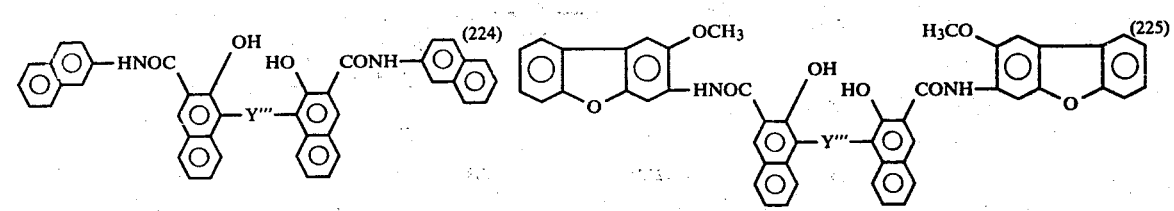
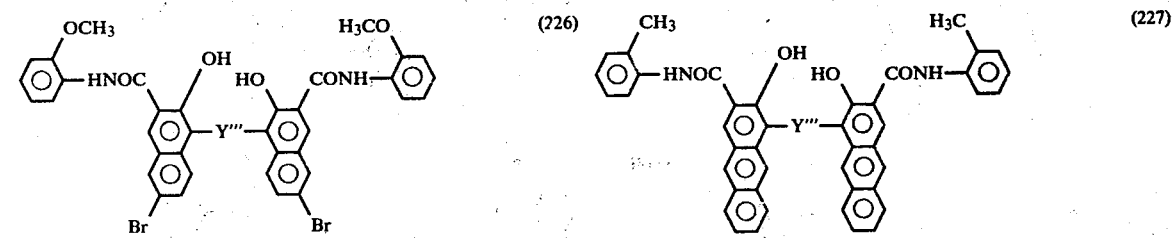
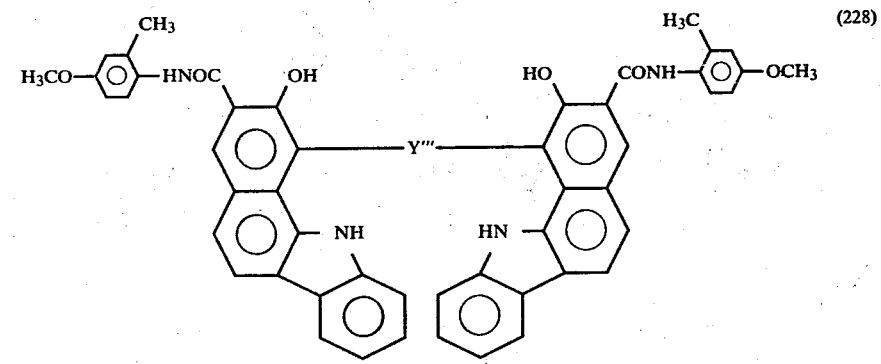
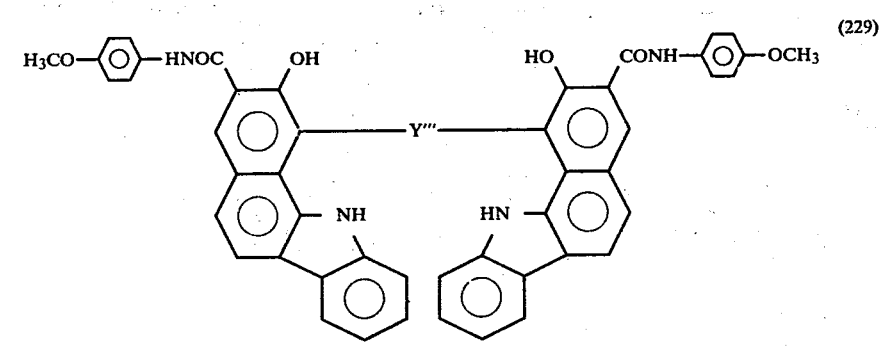

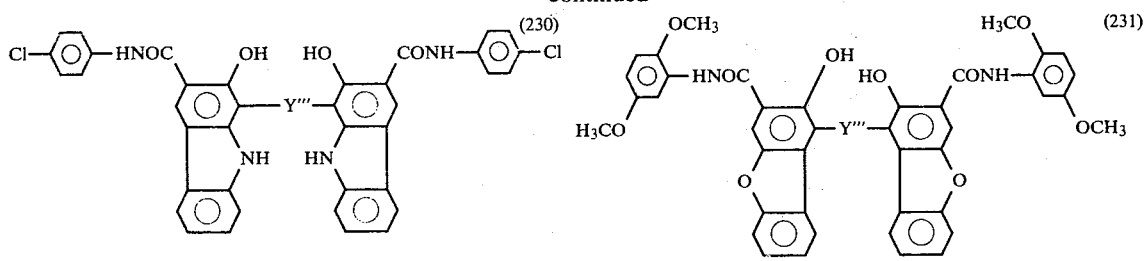
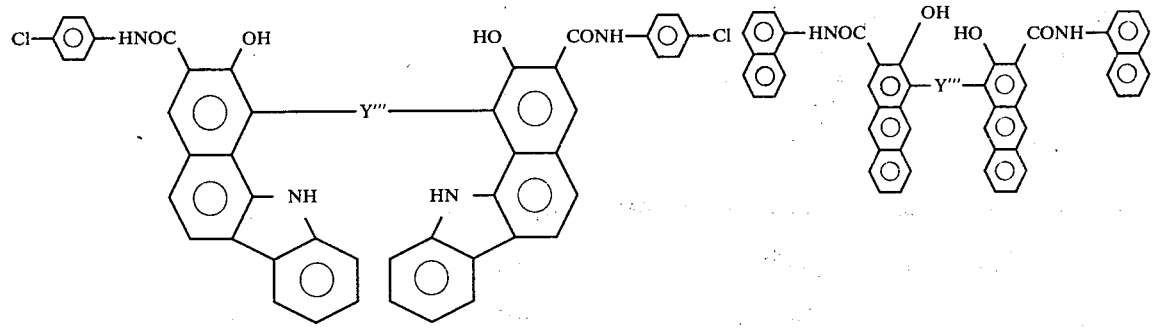
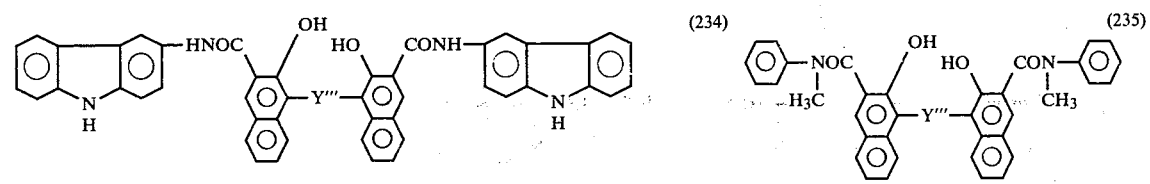
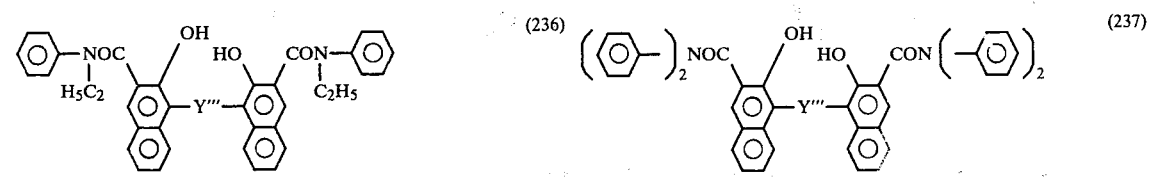
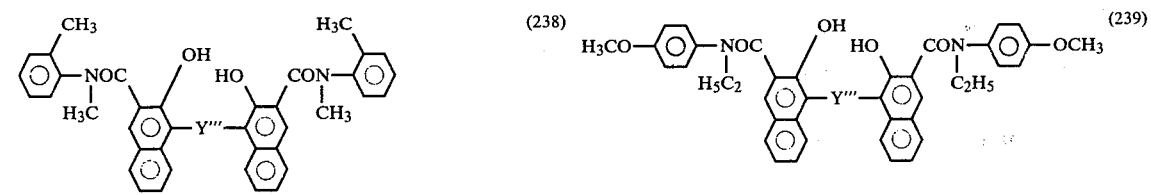
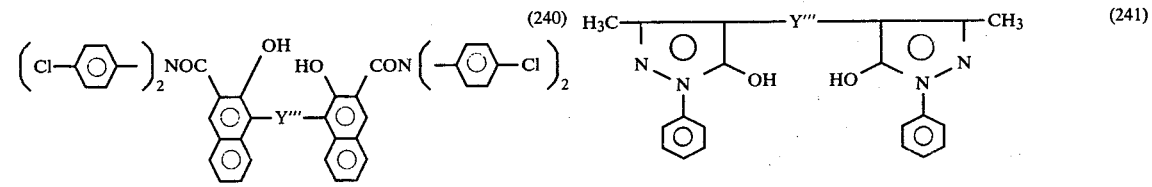
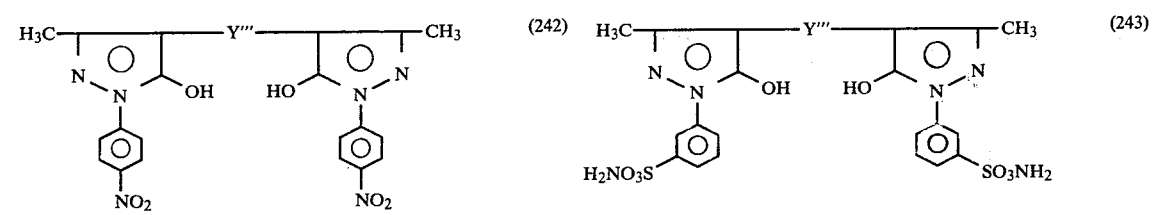

-continued
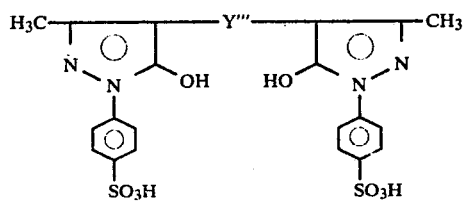 (244)
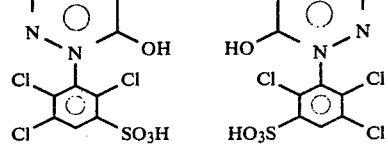 (245)
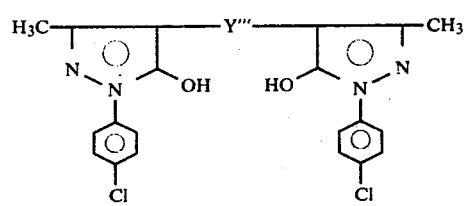 (246)
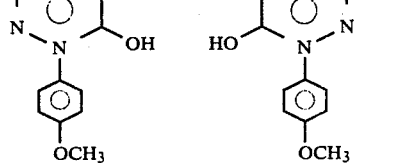 (247)
(248) 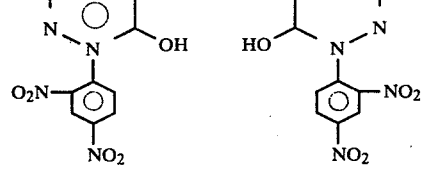 (249)
(250) 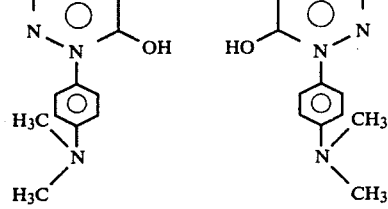 (251)
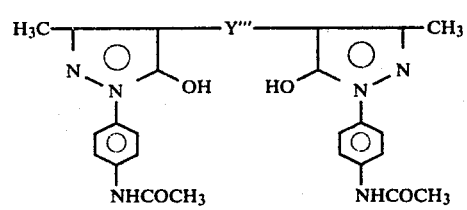 (252) (253)
(254) 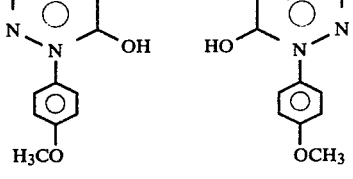 (255)
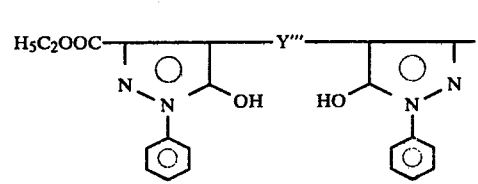 (256) 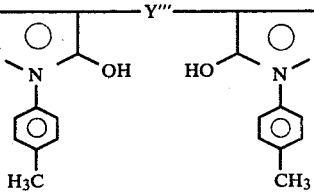 (257)

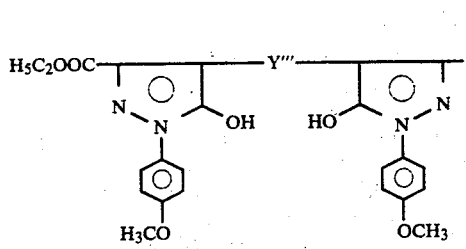
(258)

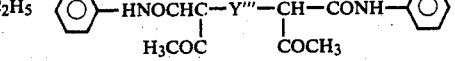
(259)

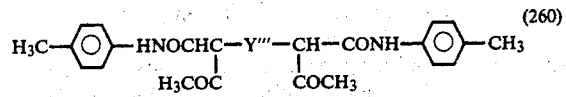
(260)

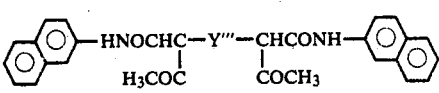
(261)

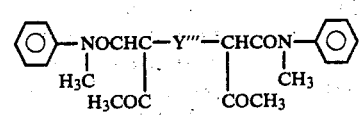
(262)

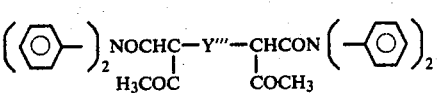
(263)

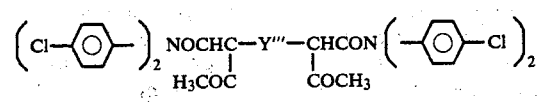
(264)

These disazo compounds can also be prepared by the same process as that for the compound expressed by the general formula (I). That is, these disazo pigments can be easily prepared by the process comprising first diazotizing the starting material 3,6-diaminocarbazole and N-substituent thereof to precipitate tetrazonium salt and thereafter effecting coupling within an appropriate organic solvent such as N,N-dimethyl formamide in the presence of a coupler corresponding to the aforedescribed various pigments and in the presence of alkali.

Figure 7:
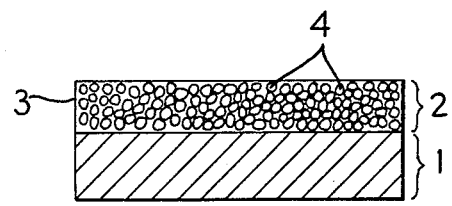
FIGS. 7 through 9 are enlarged sectional views of various photosensitive materials according to the present invention.
Figure 8:
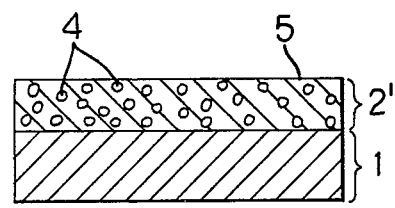
Figure 9:
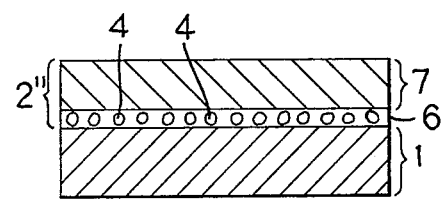

The photosensitive materials according to the present invention contain the above mentioned disazo pigments and can has such structures as illustrated in FIGS. 7 through 9 according to the way of application of these pigments. The photosensitive material illustrated in FIG. 7 is one prepared by forming a disazo pigment 4 (which probably serves herein as a photoconductive substance)~resinous binder 3 type photosensitive layer 2 on a conductive support 1. The photosensitive material illustrated in FIG. 8 is one prepared by forming a disazo pigment 4 (which probably serves herein as a charge-carrier-generating substance)~charge-transfer medium (which is a mixture of a charge-transfer substance and a resinous binder) 5 type photosensitive layer 2' on a conductive support 1. The photosensitive material illustrated in FIG. 9 is a modification of the photosensitive material in FIG. 8, and the photosensitive layer 2" thereof consists of a charge-carrier-generating layer 6 and a charge-transfer-medium layer 7.

In the photosensitive material of FIG. 7, the disazo pigment probably acts as a photoconductive substance, and generation and transfer of the charge-carrier necessary for light decay may be performed through the pigment particles. In the case of the photosensitive material of FIG. 8, said charge-transfer substance probably forms a charge-transfer medium together with said binder (plus a plasticizer as occasion demands), while said disazo pigment probably acts as a charge-carrier-generating substance. This charge-transfer medium does not have any charge-carrier-generating ability like disazo pigments, but has an ability to accept and transfer the charge-carrier generated by disazo pigments. That is, in the case of the photosensitive material of FIG. 8, generation of the charge-carrier necessary for light decay may be performed by the disazo pigment, while transfer of the charge-carrier may be performed mainly by the charge-transfer medium. An essential condition further required for the charge-transfer medium on this occasion is that the range of absorption wavelength of the charge-transfer medium should not fall on mainly the range of absorption wavelength of the visible region the disazo pigment. The reason for this is that, in order to generate the charge-carrier efficiently in the disazo pigment, it is necessary to transmit the light to the surface of the pigment. This rule, however, does not apply to the case of, for instance, a photosensitive material which is only sensitive to a specific wavelength. Therefore, the absorption wavelength of the charge-transfer medium and that of the disazo pigment should not completely overlap each other. Next, in the case of the photosensitive material of FIG. 9, the light after passing through the charge-transfer medium layer probably reaches to the photosensitive layer 2" constituting a charge-carrier-generating layer to cause generation of the charge-carrier in the disazo pigment of this portion, while the charge-transfer medium layer accepts and transfers the charge-carrier pouring therein. The mechanism that generation of the charge-carrier necessary for light decay may be performed by the disazo pigment and transfer of the charge-carrier may be performed by the charge-transfer medium in this photosensitive material is the same as in the case of the photosensitive material illustrated in FIG. 8. The disazo pigment herein may be also a charge-carrier-generating substance.

In order to prepare the photosensitive material of FIG. 7, it suffices to coat a dispersion obtained by dispersing fine particles of a disazo pigment in a binder solution on a conductive support and dry thereafter. In order to prepare the photosensitive material of FIG. 8, it suffices to disperse fine particles of a disazo pigment in a solution obtained by dissolving a charge-transfer substance in a binder, coat the resulting dispersion on a conductive support, and dry thereafter. The photosensitive material of FIG. 9 can be obtained either by depositing a disazo pigment on a conductive support through vacuum evaporation or through the procedure comprising dispersing fine particles of a disazo pigment in an appropriate solvent containing a binder dissolved therein as occasion demands, coating the resulting dispersion on a conductive support and drying thereafter, subjecting the thus formed photosensitive layer to the surface finishing by, for instance, puff-grinding or the like, if necessary, thereby adjusting the thickness of the coating film, and thereafter coating thereon a solution containing a charge-transfer substance and a binder, followed by the drying. In any case, the disazo pigment for use in the present invention is employed upon pulverizing into a particle size of less than 5μ, preferably less than 2μ, by means of a ball-mill or the like. Coating is performed by the conventional means such as doctor blade, wire bar, etc. The thickness of the photosensitive layer in the case of the photosensitive materials illustrated in FIG. 7 and FIG. 8 is about 3 to 50μ, preferably 5 to 20μ. In the case of the photosensitive material illustrated in FIG. 9, the desirable thickness of the charge-carrier-generating layer is less than 5μ, preferably less than 2μ, and the thickness of the charge-transfer medium layer is about 3 to 50μ, preferably 5 to 20μ. In the case of the photosensitive material illustrated in FIG. 7, the appropriate ratio of the disazo pigment contained in the photosensitive layer is 30 to 70 wt.%, preferably about 50 wt.% based on the weight of the photosensitive layer. (As described in the foregoing, in the case of the photosensitive material of FIG. 7, the disazo pigment acts as a photoconductive substance, and generation and transfer of the charge carrier necessary for light decay are performed by the pigment particles. Therefore, contact between the pigment particles is desirable to be continuous from the photosensitive layer surface to the support. Accordingly, the ratio of the pigment to the photosensitive layer is desirable to be relatively high, but when the strength as well as the sensitivity of the photosensitive layer is taken into consideration, it is preferably about 50 wt.%.) In the case of the photosensitive material illustrated in FIG. 8, the disazo pigment accounts for 1 to 50 wt.%, preferably less than 20 wt.% of the photosensitive layer, and the charge-transfer substance accounts for 10 to 95 wt.%, preferably 30 to 90 wt.%, of the photosensitive layer. And, in the case of the photosensitive material illustrated in FIG. 9, the ratio of the charge-transfer substance to the charge-transfer medium layer is 10 to 95 wt.%, preferably 30 to 90 wt.% like the ratio of the charge-transfer substance to the photosensitive layer in the photosensitive material of FIG. 8. Further, in the preparation of all photosensitive materials in FIGS. 7 through 9, it is possible to employ some plasticizer jointly with the binder.

In the photosensitive materials according to the present invention, as the conductive support, a plate or foil of metal such as aluminum, etc., a plastic film deposited with a metal such as aluminum, etc. through evaporation, or a paper processed for conductivity are useful. As applicable binders, there can be cited such condensation resins as polyamide, polyurethane, polyester, epoxide resin, polyketone, polycarbonate, etc. and such vinyl polymers as polyvinyl ketone, polystyrene, poly-N-vinyl carbazole, polyacrylamide, etc.; yet, resins having insulating and adhesive properties are all useful. As applicable plasticizers, there can be cited halogenated paraffin, polybiphenyl chloride, dimethyl naphthalene, dibutyl phthalate, etc. And, to cite applicable charge-transfer substances, as for high molecular substances, there are such vinyl polymers as poly-N-vinyl carbazole, halogenated poly-N-vinyl carbazole, polyvinyl pyrene, polyvinyl indroquinoxaline, polyvinyl bibenzothiaphene, polyvinyl anthracene, polyvinyl acridine, etc. and such condensation resins as pyrene-formaldehyde resin, bromopyreneformaldehyde resin, ethyl carbazole-formaldehyde resin, chloroethyl carbazole formaldehyde resin, etc., and as for low molecular substances (monomers), there are fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-one, 2-nitro-4H-indeno[1,2-b]thiophene-4-one, 2,6,8-trinitro-4H-indeno[1,2-b]thiophene-4-one, 8H-indeno[2,1-b]thiophene-8-one, 2-nitro-8H-indeno[2,1-b]thiophene-8-one, 2-bromo-6,8-dinitro-4H-indeno[1,2-b]thiophene, 6,8-dinitro-4H-indeno[1,2-b]thiophene, 2-nitrodibenzothiophene, 2,8-dinitrodibenzothiophene, 3-nitrodibenzothiophene-5-oxide, 3,7-dinitrodibenzothiophene-5-oxide, 1,3,7-trinitrodibenzothiophene-5,5-dioxide, 3-nitrodibenzothiophene-5,5-dioxide, 3,7-dinitrodibenzothiophene-5,5-dioxide, 4-dicyanomethylene-4H-indeno[1,2-b]thiophene, 6,8-dinitro-4-dicyanomethylene-4H-indeno[1,2-b]thiophene, 1,3,7,9-tetranitrobenzo[c]cinnoline-6-oxide, 2,4,8-trinitrobenzo[c]cinnoline-6-oxide, 2,4,8-trinitrothioxanthone, 2,4,7-trinitro-9,10-phenanthrenequinone, 1,4-naphthoquinonebenzo[a]anthracene-7,12-dione, 2,4,7-trinitro-9-dicyanomethylene fluorenone, tetrachlorophthalic anhydride, 1-bromopyrene, trimethylpyrene, 1-ethylpyrene, 1-acetylpyrene, carbazole, N-ethyl carbazole, N-β-chloroethyl carbazole, N-β-hydroxyethyl carbazole, 2-phenyl inole, 2-phenyl naphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl) pyrazoline, 2-phenyl-4-(4-diethylaminophenyl)-5-phenyl oxazole, triphenyl amine, tris(4-diethylaminophenyl) methane, 3,6-bis(dibenzylamino)-9-ethyl carbazole, etc. These charge-transfer substances are employed either singly or in combination therewith.

Further, all of the photosensitive materials thus prepared can be provided with an adhesive layer or a barrier layer disposed in between the conductive support and the photosensitive layer as occasion demands. As the materials for use in forming these layers, polyamide, nitrocellulose, aluminum oxide, etc. are appropriate, and the thickness of the layers is preferably less than 1μ.

In order to perform the copying by using a photosensitive material under the present invention, the photosensitive layer side of the photosensitive material is electrified and exposed to light and developing is conducted thereafter, and, if necessary, transfer onto a paper and the like is performed, whereby the copying is completed.

The photosensitive materials according to the present invention have excellent advantages such that they are generally high in sensitivity and rich in flexibility.

In the following will be given examples embodying the invention.

DESCRIPTION OF THE PREFERRED EMBODIMENTS

EXAMPLE 1

Preparation of disazo compound No. I shown in Table-1

17.7 g of 3,6-diamino-9-ethyl carbazole were added to dilute hydrochloric acid consisting of 140 ml of concentrated hydrochloric acid and 140 ml of water and stirred thoroughly at 60° C. for about 30 minutes. Next, after cooling the thus prepared mixture down to about 0° C., a solution prepared by dissolving 11.2 g of sodium nitrite in 17 ml of water was added thereto in about 30 minutes at a temperature in the range of from 0° to 5° C. Thereafter, the mixture was stirred for about 30 minutes at the same temperature as above, and then a small amount of unreacted matter was filtered. The resulting filtrate was poured in 120 ml of 42% borofluoric acid, and the crystals separated thereby were collected by filtering, washed in water and dried, whereby there were obtained 27.9 g (yield rate: 84%) of tetrazonium difluoroborate as yellow crystals (decomposition point: about 170° C.).

21.1 g of the thus obtained tetrazonium salt together with 30.8 g of 2-hydroxy-3-naphthoic acid-3'-nitroanilide as a coupling ingredient were dissolved in 4,250 ml of cooled N,N-dimethyl formamide, and to the resulting solution were added dropwise a solution consisting of 41 g of sodium acetate and 600 ml of water in one hour at a temperature of 4° to 8° C. Thereafter, the bath for cooling was removed and 3 hours' stirring was conducted subsequent thereto at the room temperature. Then, the precipitate was collected by filtering, washed 3 times with 2 l of water, and thereafter rinsed 8 times with 2 l of N,N-dimethyl formamide. Subsequently, by rinsing out N,N-dimethyl formamide with acetone and drying at a temperature of 70° C. and under a reduced pressure of 2 mmHg, there were obtained 34.1 g (yield rate: 79%) of a disazo compound corresponding to Compound No. (I) expressed by the general formula (I).

EXAMPLES 2 THROUGH 12

Preparation of disazo compounds No. II (Example 2), No. III (Example 3), No. IV (Example 4), No. V (Example 5), No. VI (Example 6), No. VII (Example 7), No. VIII (Example 8), No. IX (Example 9), No. X (Example 10) No. XI (Example 11) and No. XII (Example 12) (cf. Table-1)

Through the same process as in Example 1, tetrazonium difluoroborate was prepared, and then through the same procedure as in Example 1 save for the employment of the respective compounds listed in the following Table-2 as coupling ingredient, varieties of disazo compounds shown in the foregoing Table-1 were obtained.

TABLE 2

| Compound No. | Coupling ingredient |
|---|---|
| II | HO, CONH—(phenyl) |
| III | HO, CONH—(2-methoxyphenyl, OCH₃) |
| IV | HO, CONH—(2-methylphenyl, CH₃) |
| V | HO, CONH—(4-nitrophenyl, NO₂) |
| VI | HO, CONH—(4-chlorophenyl, Cl) |
| VII (86) | HO, CONH—(4-dimethylaminophenyl, N(CH₃)₂) |

TABLE 2-continued

| Compound No. | Coupling ingredient |
|---|---|
| VIII | HO-naphthalene-CONH-phenyl(OCH₃)(OCH₃) [3-hydroxy-N-(2,5-dimethoxyphenyl)-2-naphthamide] |
| IX | HO-naphthalene-CONH-phenyl(OCH₃)(Cl)(OCH₃) |
| X | HO-naphthalene-CONH-phenyl(OCH₃)(OCH₃)(Cl) |
| XI | 3-methyl-1-phenyl-5-pyrazolone |
| XII | 3-methyl-1-(4-nitrophenyl)-5-pyrazolone |

EXAMPLE 13

Preparation of electrophotographic sensitive material 1 part by weight of polyester resin (namely, Polyester Adhesive 49000, the manufacture of Du Pont Inc.), 1 part by weight of disazo pigment (1) expressed by the general formula (II) and 26 parts by weight of tetrahydrofuran were pulverized and mixed within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 7μ-thick photosensitive layer and a structure as illustrated in FIG. 7.

Subsequently, after charging positive electricity on the photosensitive layer side of this photosensitive material by applying +6 KV corona discharge for 20 seconds by means of a commercial electrostatic copying paper testing apparatus, the photosensitive material was left alone in the dark for 20 seconds, and the surface potential Vpo (volt) at that time was measured. Next, light was applied to the photosensitive layer by means of a tungsten lamp so as to attain the illumination of 20 luxes on the surface thereof, and the time (unit: second) required for reducing said surface potential Vpo to half was sought, whereby the amount of exposure $E_{\frac{1}{2}}$ (lux-sec.) was obtained. The result was as follows:

$Vpo = 750$ V, $E_{\frac{1}{2}} = 35$ lux-sec.

EXAMPLES 14 THROUGH 22

Preparation of electrophotographic sensitive materials

Varieties of photosensitive materials were prepared by applying the same procedure as in Example 13 save for employing the respective disazo pigments expressed by the general formula (II) listed in the following Table-3 in lieu of the disazo pigment (1) used in Example 13. When these photosensitive materials were subjected to the same measurement as in Example 13, the result was as shown in Table-3.

TABLE 3

| Example No. | Disazo pigment No. | Vpo (volt) | $E_{\frac{1}{2}}$ (lux · sec.) |
|---|---|---|---|
| 14 | (2) | 730 | 28 |
| 15 | (67) | 700 | 20 |
| 16 | (71) | 680 | 7 |
| 17 | (70) | 800 | 28 |
| 18 | (80) | 730 | 20 |
| 19 | (84) | 740 | 18 |
| 20 | (98) | 790 | 22 |
| 21 | (102) | 740 | 25 |
| 22 | (133) | 780 | 29 |

EXAMPLE 23

Preparation of electrophotographic sensitive material 10 parts by weight of polyester resin (the same in Example 13), 10 parts by weight of 2,4,7-trinitro-9-fluorenone, 2 parts by weight of the disazo compound (1) expressed by the general formula (II) and 198 parts by weight of tetrahydrofuran were pulverized and mixed within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 10μ-thick photosensitive layer and a structure illustrated in FIG. 8. Subsequently, measurement of Vpo and $E_{\frac{1}{2}}$ of this photosensitive material was conducted through the same procedure as in Example 13 save for applying −6 KV corona discharge in lieu of +6 KV corona discharge employed in Example 13. The result was as follows.

$Vpo = 430$ V, $E_{\frac{1}{2}} = 12$ lux-sec.

EXAMPLES 24 THROUGH 32

Preparation of electrophotographic sensitive materials

Varieties of photosensitive materials having a structure illustrated in FIG. 8 were prepared by applying the same procedure as in Example 23 save for employing the respective disazo pigments expressed by the general formula (II) as listed in the following Table-4 in lieu of the disazo pigment (1) used in Example 23. When these photosensitive materials were subjected to the same measurement as in Example 23, the result was as shown in Table-4, respectively.

TABLE 4

| Example No. | Disazo pigment No. | Vpo (volt) | E½ (lux · sec.) |
|---|---|---|---|
| 24 | (217) | 730 | 40 |
| 25 | (261) | 650 | 25 |
| 26 | (183) | 700 | 18 |
| 27 | (117) | 680 | 15 |
| 28 | (15) | 600 | 18 |
| 29 | (17) | 580 | 25 |
| 30 | (103) | 570 | 20 |
| 31 | (209) | 630 | 26 |
| 32 | (210) | 680 | 36 |

EXAMPLE 33

Preparation of electrophotographic sensitive material 10 parts by weight of polyester resin (the same as in Example 13), 10 parts by weight of 2,5-bis(4-diethylaminophenyl)-1,3,4-oxadiazole, 2 parts by weight of the disazo pigment (1) expressed by the general formula (II) and 198 parts by weight of tetrahydrofuran were pulverized and mixed within a ball-mill, and the resulting dispersion was coated, by means of a doctor blade, on a polyester film deposited with aluminum through vacuum evaporation and was dried at a temperature of 120° C. for 10 minutes, whereby there was prepared a photosensitive material having a 10μ-thick photosensitive layer and a structure illustrated in FIG. 8. When this photosensitive material was subsequently subjected to the same measurement as in Example 13, the result was as follows:

$Vpo = 830$ V, $E_{\frac{1}{2}} = 5$ lux·sec.

EXAMPLES 34 THROUGH 42

Preparation of electrophotographic sensitive materials

Varieties of photosensitive materials having a structure illustrated in FIG. 8 were prepared by applying the same procedure as in Example 33 save for employing the respective disazo pigments expressed by the general formula (II) as listed in the following Table-5 in lieu of the disazo pigment (1) used in Example 33. When these photosensitive materials were subsequently subjected to the same measurement as in Example 13, the result was as shown in Table-5, respectively.

TABLE 5

| Example No. | Disazo pigment No. | Vpo (volt) | E½ (lux · sec.) |
|---|---|---|---|
| 34 | (67) | 890 | 8 |
| 35 | (68) | 880 | 10 |
| 36 | (71) | 920 | 5 |
| 37 | (219) | 850 | 8 |
| 38 | (164) | 870 | 10 |
| 39 | (69) | 800 | 15 |
| 40 | (5) | 820 | 7 |
| 41 | (61) | 890 | 45 |
| 42 | (55) | 900 | 28 |

EXAMPLE 43

Preparation of electrophotographic sensitive material 200 parts by weight of poly-N-vinyl carbazole, 33 parts by weight of 2,4,7-trinitro-9-fluorenone, 20 parts by weight of polyester resin (the same as in Example 13) and 20 parts by weight of the disazo pigment (1) expressed by the general formula (II) as added to 1780 parts by weight of tetrahydrofuran were pulverized and mixed within a ball-mill and the resulting dispersion was coated, by means of a doctor blade, on a polyester film deposited with aluminum through vacuum evaporation and was dried at a temperature of 100° C. for 10 minutes and then at a temperature of 120° C. for 5 minutes, whereby there was prepared a photosensitive material having a 13μ-thick photosensitive layer and a structure illustrated in FIG. 8. When this photosensitive material was subjected to the same measurement as in Example 13, the result was as follows:

$Vpo = 100$ V, $E_{\frac{1}{2}} = 5$ lux·sec.

EXAMPLES 44 THROUGH 52

Preparation of electrophotographic sensitive materials

Varieties of photosensitive materials having a structure illustrated in FIG. 8 were prepared by applying the same procedure as in Example 43 save for employing the respective disazo pigments expressed by the general formula (II) as listed in the following Table-6 in lieu of the disazo pigment (1) used in Example 43. When these photosensitive materials were subjected to the same measurement of Vpo and E½ as in Example 13, the result was as shown in Table-6, respectively.

TABLE 6

| Example No. | Disazo pigment No. | Vpo (volt) | E½ (lux · sec.) |
|---|---|---|---|
| 44 | (183) | 1300 | 10 |
| 45 | (68) | 1100 | 4 |
| 46 | (67) | 1200 | 2 |
| 47 | (71) | 990 | 1 |
| 48 | (138) | 1000 | 7 |
| 49 | (105) | 1100 | 5 |
| 50 | (205) | 1000 | 2 |
| 51 | (32) | 1000 | 7 |
| 52 | (5) | 1280 | 2 |

EXAMPLE 53

Preparation of electrophotographic sensitive material 2 parts by weight of the disazo pigment (1) expressed by the general formula (II) and 98 parts by weight of tetrahydrofuran were pulverized and mixed within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,4,7-trinitro-9-fluorenone, 2parts by weight of polycarbonate (namely, Panlite L, the manufacture of TEIJIN Co., Ltd.) and 46 parts by weight of tetrahydrofuran together, and this dispersion was coated on the foregoing charge-carrier-generating layer by means of a doctor blade and then dried at a temperature of 100° C. for 10 minutes to form a 10μ-thick charge-transfer medium layer, whereby there was obtained a photosensitive material having a structure illustrated in FIG. 9. When the thus obtained photosensitive material was subjected to the same measurement as in Example 13, the result was as follows:

$Vpo = 900$ V, $E_{\frac{1}{2}} = 15$ lux-sec.

EXAMPLES 54 THROUGH 62

Preparation of electrophotographic sensitive materials

Varieties of photosensitive materials having a structure illustrated in FIG. 9 were prepared by applying the same procedure as in Example 53 save for employing the respective disazo pigments expressed by the general formula (II) as listed in the following Table-7 in lieu of the disazo pigment (1) used in Example 43. When these photosensitive materials were subjected to the same measurement of Vpo and $E_{\frac{1}{2}}$ as in Example 13, the result was as shown in Table-7.

TABLE 7

| Example No. | Disazo pigment No. | Vpo (volt) | $E_{\frac{1}{2}}$ (lux · sec.) |
|---|---|---|---|
| 54 | (2) | 900 | 19 |
| 55 | (5) | 930 | 5 |
| 56 | (20) | 950 | 5 |
| 57 | (35) | 890 | 10 |
| 58 | (67) | 920 | 10 |
| 59 | (68) | 950 | 15 |
| 60 | (71) | 990 | 5 |
| 61 | (79) | 870 | 15 |
| 62 | (250) | 900 | 25 |

EXAMPLE 63

Preparation of electrophotographic sensitive materials 2 parts by weight of the disazo pigment (1) expressed by the general formula (II) and 98 parts by weight of tetraydrofuran were pulverized and mixed within a ball-mill, and the resulting dispersion was coated, by means of a doctor blade, on a polyester film deposited with aluminum through vacuum evaporation and was subjected to natural drying, whereby there was formed a 1μ-thick charge-carrier-generating layer. Meanwhile, another dispersion was prepared by mixing 2 parts by weight of 2,5-bis(4-diethylaminophenyl)-1,3,4-oxadiazole, 2 parts by weight of polycarbonate (the same as in Example 53) and 46 parts by weight of tetrahydrofuran together, and this dispersion was coated on the foregoing charge-carrier-generating layer by means of a doctor blade and then dried at a temperature of 120° C. for 10 minutes to form a 10μ-thick charge-transfer medium layer, whereby there was obtained a laminate type photosensitive material illustrated in FIG. 9. When the thus obtained photosensitive material was subjected to the same measurement as in Example 13, the result was as follows:

$Vpo = 1000$ V, $E_{\frac{1}{2}} = 5$ lux-sec.

EXAMPLES 64 THROUGH 72

Preparation of electrophotographic sensitive materials

Varieties of photosensitive materials were prepared by employing the respective disazo pigments listed in the following Table-8 in lieu of the disazo pigment (1) used in Example 63. When these photosensitive material were subjected to the same measurement of Vpo and $E_{\frac{1}{2}}$ as in Example 13, the result was as shown in Table-8.

TABLE 8

| Example No. | Disazo pigment No. | Vpo (volt) | $E_{\frac{1}{2}}$ (lux · sec.) |
|---|---|---|---|
| 64 | (71) | 1200 | 5 |
| 65 | (68) | 1100 | 19 |
| 66 | (254) | 1100 | 38 |
| 67 | (264) | 1200 | 49 |
| 68 | (223) | 1000 | 15 |
| 69 | (45) | 800 | 20 |
| 70 | (68) | 980 | 10 |
| 71 | (72) | 990 | 10 |
| 72 | (50) | 1000 | 30 |

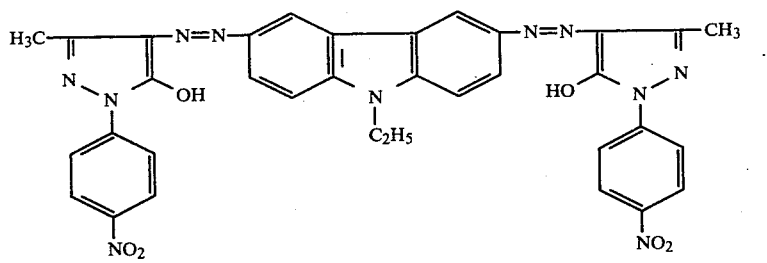

What is claimed is:

1. A compound having the formula

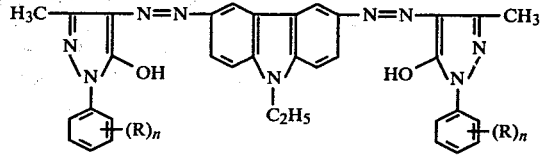

wherein R is alkyl, alkoxy, nitro, dialkylamino or halogen, n is zero or an integer of from 1 to 3, and R can be the same or different when n is 2 or 3.

2. A compound having the formula

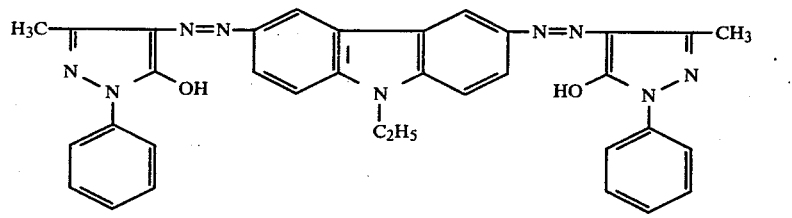

3. A compound having the formula